United States Patent
Saika et al.

(10) Patent No.: US 8,352,426 B2
(45) Date of Patent: Jan. 8, 2013

(54) COMPUTING SYSTEM AND DATA MANAGEMENT METHOD

(75) Inventors: Nobuyuki Saika, Yokosuka (JP); Kumiko Minamino, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 12/747,210

(22) PCT Filed: May 17, 2010

(86) PCT No.: PCT/JP2010/003305
§ 371 (c)(1),
(2), (4) Date: Jun. 10, 2010

(87) PCT Pub. No.: WO2011/145132
PCT Pub. Date: Nov. 24, 2011

(65) Prior Publication Data
US 2011/0282841 A1 Nov. 17, 2011

(51) Int. Cl.
*G06F 7/00* (2006.01)
*G06F 17/00* (2006.01)
(52) U.S. Cl. .................. 707/615; 707/622; 707/634
(58) Field of Classification Search .................. 707/615, 707/622, 634
See application file for complete search history.

(56) References Cited

U.S. PATENT DOCUMENTS

| 7,225,211 B1 | 5/2007 | Colgrove et al. |
| 2007/0185852 A1 | 8/2007 | Erofeev |
| 2010/0023717 A1 | 1/2010 | Jinno et al. |

FOREIGN PATENT DOCUMENTS

| JP | 2008-040699 | 2/2008 |
| WO | WO 2009/019128 | 2/2009 |

OTHER PUBLICATIONS

Written Opinion in International Application No. PCT/JP2010/003305 mailed Feb. 7, 2011.
International Search Report in International Application No. PCT/JP2010/003305 mailed Feb. 7, 2011.

*Primary Examiner* — Mariela Reyes
(74) *Attorney, Agent, or Firm* — Brundidge & Stanger, P.C.

(57) ABSTRACT

Proposed are a computing system and a data management method for improving the usage efficiency of logical volumes without lowering the response performance In a computing system that includes a first storage apparatus in which first and second storage volumes are configured, a file storage apparatus for controlling the first logical volume, a second storage apparatus, and an archive apparatus for controlling the second storage apparatus, the first storage apparatus acquires a snapshot of the first logical volume at regular or irregular intervals and stores differential data in the second logical volume, specifies a file for which the consumption amount of the second logical volume exceeds a predetermined threshold, causes the first storage apparatus to acquire a snapshot of the specified file, and if a read request to read the file is supplied, generates the file on the basis of data stored in the first and second logical volumes.

14 Claims, 37 Drawing Sheets

| .... | SUPER BLOCK | DIRECTORY ENTRY | iNODE MANAGEMENT TABLE | DATA BLOCK | .... |
|---|---|---|---|---|---|
| | 70 | 71 | 72 | 73 | |

| DIRECTORY PATH NAME | iNODE NUMBER |
|---|---|
| /home/user-01/・・・/a.txt | 100 |
| /home/user-02/・・・/b.txt | 200 |
| : | : |
| 71A | 71B |

71

<SUPPLEMENT>
u → user, g → group, o → other abbreviations: (someone other than user)
r → read, x → execute, w → abbreviations: write

FIG.17

| inode NUMBER | OWNER | ACCESS RIGHTS | SIZE | WORM ATTRIBUTE | SNAPSHOT ACQUISITION FLAG | LINK DESTINATION | DATA BLOCK ADDRESS 1 | DATA BLOCK ADDRESS 2 | DATA BLOCK ADDRESS 3 |
|---|---|---|---|---|---|---|---|---|---|
| .. | .. | .. | .. | .. | .. | .. | .. | .. | .. |
| 100 | user001 | u:g:o rxw rxw rxw | 1000 KB | ON or OFF | ON or OFF | LINK DESTINATION IN ARCHIVE APPARATUS<br><br>TEMPORARY FILE LINK DESTINATION<br><br>SNAPSHOT LINK DESTINATION | - | - | - |
| .. | .. | .. | .. | .. | .. | .. | .. | .. | .. |

| DATE AND TIME | MIGRATION REQUEST SOURCE | PATH NAME OF MIGRATED FILE |
|---|---|---|
| 2010 0112 12:00:00 | Host-01 | /home/user01/a.txt |
| 2010 0112 12:00:00 | Host-01 | /home/user02/b.txt |
| : | : | : |
| : | : | : |
| : | : | : |

FIG.39

| MIGRATION REQUEST SOURCE | DVOL CONSUMPTION SIZE [MB] |
|---|---|
| Host-01 | 250 |
| : | : |
| : | : |
| : | : |

COMPUTING SYSTEM AND DATA MANAGEMENT METHOD

TECHNICAL FIELD

The present invention relates to a computing system and data management method and, for example, can be suitably applied to a computing system that includes a file storage apparatus and an archive apparatus.

BACKGROUND ART

Conventionally, as one function of a storage apparatus, there exists a data management function for migrating files stored by a client/host in a logical volume to another storage apparatus such as an archive apparatus on the basis of a prescribed policy determined beforehand (a conditional equation based on a reference frequency or the like, for example) (refer to PTL1).

A storage apparatus that is equipped with a data management function of this type stores metadata (hereinafter referred to as a stub file), which is obtained by recording address information of a file migration destination in a source storage location, in order to hide the fact that the file storage location has changed from the client/host. Further, if there is a read request for a file that has been migrated to another storage apparatus, the storage apparatus acts as if the file were in the original storage location by acquiring the corresponding file from another storage apparatus of the migration destination on the basis of the address information contained in the stub file and transferring the acquired file to the read request source. This behavior is known as recall processing. Note that, as a well-known example of a method for efficiently controlling backup data (snapshots) of a plurality of generations in an HSM (Hierarchical Storage Management) system, there exists PTL2.

Citation List
Patent Literature

[PTL1] U.S. Patent Publication No. 7225211
[PTL2] Japanese Unexamined Patent Publication No. 2008-40699

SUMMARY OF INVENTION

Technical Problem

Furthermore, the abovementioned recall processing is performed by way of five steps, namely, by receiving a read request (first step), acquiring address information of the migration destination of a corresponding file from a stub file (second step), acquiring the file from another storage apparatus which is the migration destination (third step), temporarily saving the acquired file in a logical volume in an attached storage apparatus (fourth step), and then transferring the file to the read request source (fifth step).

However, according to this conventional recall processing method, if recall processing occurs frequently, files that are recalled from the other storage apparatus in step SP4 are accumulated in large numbers in the logical volume for saving the files (normally the logical volume in which files are stored before migration), thereby depleting the capacity of the logical volume.

As one method for solving this problem, a method for frequently deleting the temporary file from the logical volume of the migration-source storage apparatus may be considered. Furthermore, as a result of this method, recall processing is performed frequently and on each occasion the file is returned to the migration-source storage apparatus from the migration-destination storage apparatus, thus producing deterioration in the read request response performance of the migration-source storage apparatus. In addition, in the migration-source storage apparatus, unless the files returned from the migration-destination storage apparatus by the recall processing are suitably removed from the migration-source logical volume, there is the problem of a drop in the usage efficiency of the logical volume.

The present invention was devised in view of the above problem, and proposes a computing system and data management method for improving the usage efficiency of logical volumes without lowering the response performance

Solution to Problem

In order to achieve the foregoing object, the present invention provides a computing system, comprising a first storage apparatus equipped with one or more memory apparatuses and in which first and second logical volumes are configured in a memory area provided by the one or more memory apparatuses; a file storage apparatus for controlling reading/writing of data from/to the first storage apparatus and providing the first logical volume configured in the first storage apparatus to the client/host; a second storage apparatus equipped with one or more memory apparatuses; and an archive apparatus for controlling reading/writing of data from/to the second storage apparatus, wherein the first storage apparatus acquires a full or partial snapshot of the first logical volume at regular or irregular intervals, and when, after acquiring the snapshot, the acquired full or partial snapshot of the first logical volume is updated, saves pre-update data in the first logical volume to the second logical volume; wherein the file storage apparatus, in response to a migration request from the client/host, migrates the file designated in the migration request among the files stored in the first logical volume to the second storage apparatus via the archive apparatus, while specifying, among the files whose data has been saved to the second logical volume, a file for which the consumption amount of the second logical volume exceeds a predetermined threshold, causing the first storage apparatus to acquire a snapshot of the specified file, and then causing the first storage apparatus to delete the file from the first logical volume, wherein, if a read request to read a file stored in the first logical volume is supplied from the client/host, the file storage apparatus searches for the location where the file is saved, and wherein, if a snapshot of the file has been acquired, the file storage apparatus generates the file on the basis of data stored in the first and second logical volumes, and transfers the generated file to the client/host which is the source of the read request.

In addition, the present invention provides a data management method for a computing system that comprises a first storage apparatus equipped with one or more memory apparatuses and in which first and second logical volumes are configured in a memory area provided by the one or more memory apparatuses; a file storage apparatus for controlling reading/writing of data from/to the first storage apparatus and providing the first logical volume configured in the first storage apparatus to the client/host; a second storage apparatus equipped with one or more memory apparatuses; and an archive apparatus for controlling reading/writing of data from/to the second storage apparatus, the data management method comprising a first step in which the first storage apparatus acquires a full or partial snapshot of the first logical volume at regular or irregular intervals, and when, after acquiring the snapshot, the acquired full or partial snapshot of the first logical volume is updated, the first storage apparatus saves pre-update data in the first logical volume to the second logical volume; and in which first step, the file storage apparatus, in response to a migration request from the client/host, migrates the file designated in the migration request among the files stored in the first logical volume to the second storage apparatus via the archive apparatus, while specifying, among the files whose data has been saved to the second logical volume, a file for which the consumption amount of the second logical volume exceeds a predetermined threshold, causing the first storage apparatus to acquire a snapshot of the specified file, and then causing the first storage apparatus to delete the file from the first logical volume; a second step in which, if a read request to read a file stored in the first logical volume is supplied from the client/host, the file storage apparatus searches for the location where the file is saved; and a third step in which, if a snapshot of the file has been acquired, the file storage apparatus generates the file on the basis of data stored in the first and second logical volumes, and transfers the generated file to the client/host which is the source of the read request.

Advantageous Effects of Invention

According to the present invention, even in cases where a read request for data migrated to a second storage apparatus is supplied from a client/host to a first storage apparatus, it is possible to prevent the generation of so-called recall processing, in which a file for which a snapshot has been acquired is transferred to the first storage apparatus from the second storage apparatus even when this file has been deleted from a first logical volume. Thus, according to the present invention, it is possible to improve logical volume usage efficiency without lowering the response performance

BRIEF DESCRIPTION OF DRAWINGS

FIGS. 7A to 7C are charts illustrating a differential data management method during snapshot processing.
FIGS. 8A to 8C are charts illustrating a differential data management method during snapshot processing.
FIGS. 9A to 9C are charts illustrating a differential data management method during snapshot processing.
FIGS. 10A to 10C are charts illustrating a differential data management method during snapshot processing.
[FIG. 17] A block diagram showing a configuration of an Mode management table according to the first embodiment.
[FIG. 38] A conceptual view illustrating migration history information.
[FIG. 39] A conceptual view illustrating the functions of a migration program according to the second embodiment.

DESCRIPTION OF PREFERRED EMBODIMENTS

An embodiment of the present invention will be described in detail hereinbelow with reference to the drawings.

Figure 1:
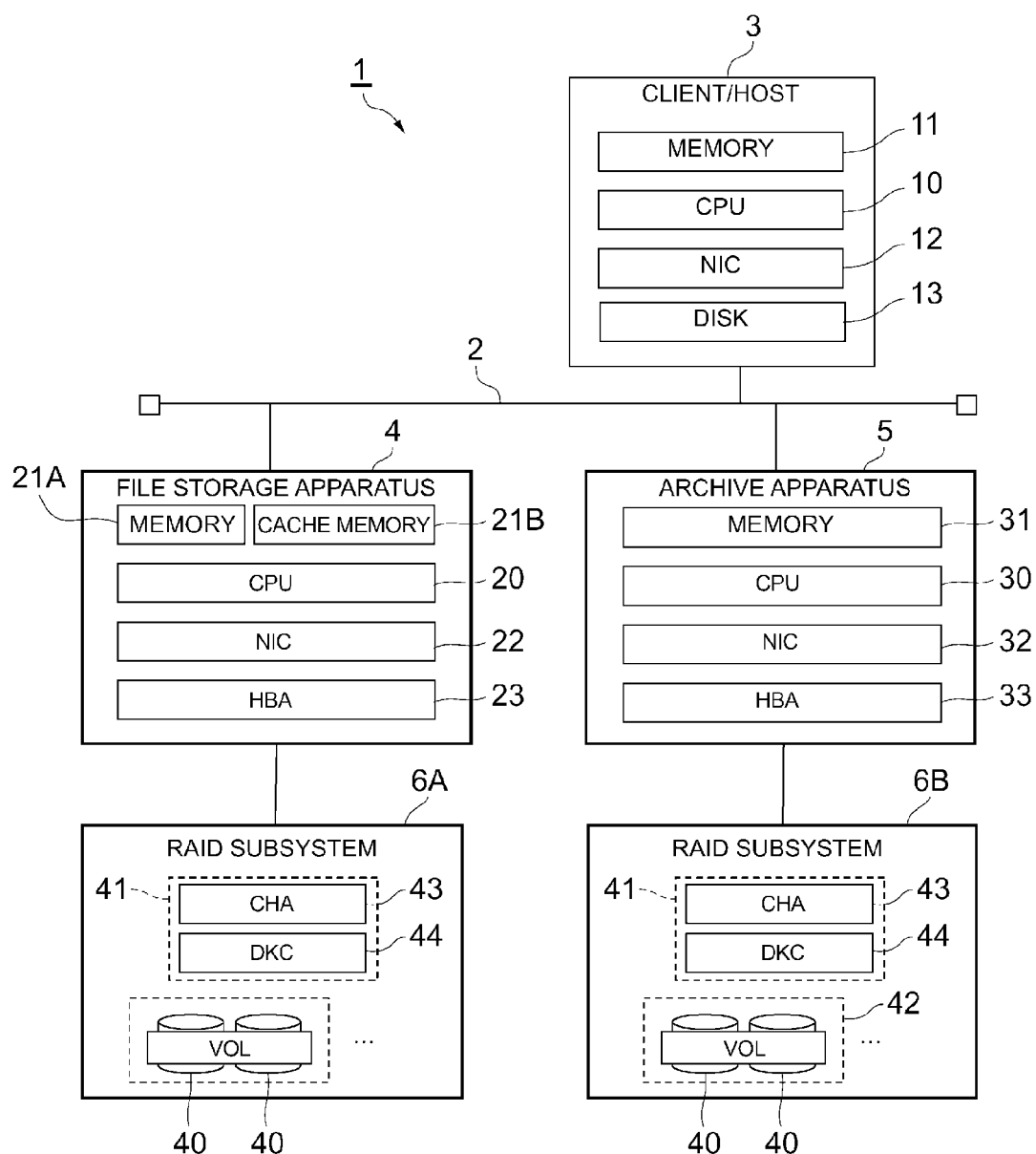
[FIG. 1] A block diagram showing a hardware configuration of a computing system according to a first embodiment.

(1) First Embodiment (1-1) Configuration of Computing System According to this Embodiment In FIG. 1, 1 indicates the whole computing system according to this embodiment. The computing system 1 is configured comprising a client/host 3, a file storage apparatus 4, and an archive apparatus 5 that are coupled together via a network 2 such as a LAN (Local Area Network) or SAN (Storage Area Network). Coupled to the file storage apparatus 4 is a first RAID subsystem 6A and coupled to the archive apparatus 5 is a second RAID subsystem 6B.

The client/host 3 is a computer apparatus that includes a CPU (Central Processing Unit) 10, a memory 11, an NIC (Network Interface Card) 12, and a disk device 13, and which is configured from a personal computer, a workstation, or a mainframe or the like, for example.

In addition, the file storage apparatus 4 is a server which includes functions for controlling reading/writing of data from/to the first RAID subsystem 6A and for providing file sharing services to the client/host 3, and which is configured comprising a CPU 20, a memory 21A, a cache memory 21B, an NIC 22, and an HBA (Host Bus Adapter) 23. The file storage apparatus 4 is coupled to the network 2 via the NIC 22, and sends and receives various types of commands and data between the client/host 3 and the archive apparatus 5 via the network 2. The file storage apparatus 4 is coupled to the first RAID subsystem 6A via the HBA 33, and reads and writes data with respect to the first RAID subsystem 6A in response to requests from the client/host 3.

The archive apparatus 5 is a server for controlling the reading/writing of data from/to the second RAID subsystem 6B and, like the file storage apparatus 4, is configured comprising a CPU 30, a memory 31, an NIC 32, and an HBA 33. The archive apparatus 5 is coupled to the network 2 via the NIC 32 and sends and receives various types of commands and data to and from the archive apparatus 5 via the network 2. Moreover, the archive apparatus 5 is coupled to the second RAID subsystem 6B via the HBA 33 and writes backup target data to the second RAID subsystem 6B in response to a request from the file storage apparatus 4.

The first and second RAID subsystems 6A and 6B are storage apparatuses that are configured comprising one or more disk devices 40, and a control unit 41 for controlling data inputs/outputs with respect to the disk devices 40.

The disk devices 40 are configured from high-cost disks such as SCSI (Small Computer System Interface) disks, and low-cost disks such as SATA (Serial AT Attachment) disks and optical disks or the like, for example. One RAID group 42 is configured from one or more disk devices 40 and one or more logical volumes VOL are configured in a physical storage area provided by each of the disk devices 40 configuring one RAID group 42. Additionally, data of files and so forth is stored by taking blocks of a prescribed size (hereinafter called "logical blocks") as units in the logical volume VOL.

Each of the logical volumes VOL is assigned a unique volume number. In the case of this embodiment, the data is input and output by designating a leading logical block address of a storage area with respect to which data is input/output, and the data length of this data, the leading logical block address being derived by combining this volume number with a block number of the logical block (LBA: Logical Block Address) assigned to each logical block.

The control unit 41 is configured comprising one or more channel adapters (CHA) 43 and one or more disk controllers (DKC) 44. The control unit 41 uses the channel adapters 43 to receive a read/write request that is supplied via the file storage apparatus 4 from the client/host 3 or a write request that is supplied via the network 2 from the file storage apparatus 4 and, in response to this read/write request or write request, the control unit 41 read/writes or writes data with respect to the corresponding disk device 40 based on control by the disk controller 44.

Figure 2:
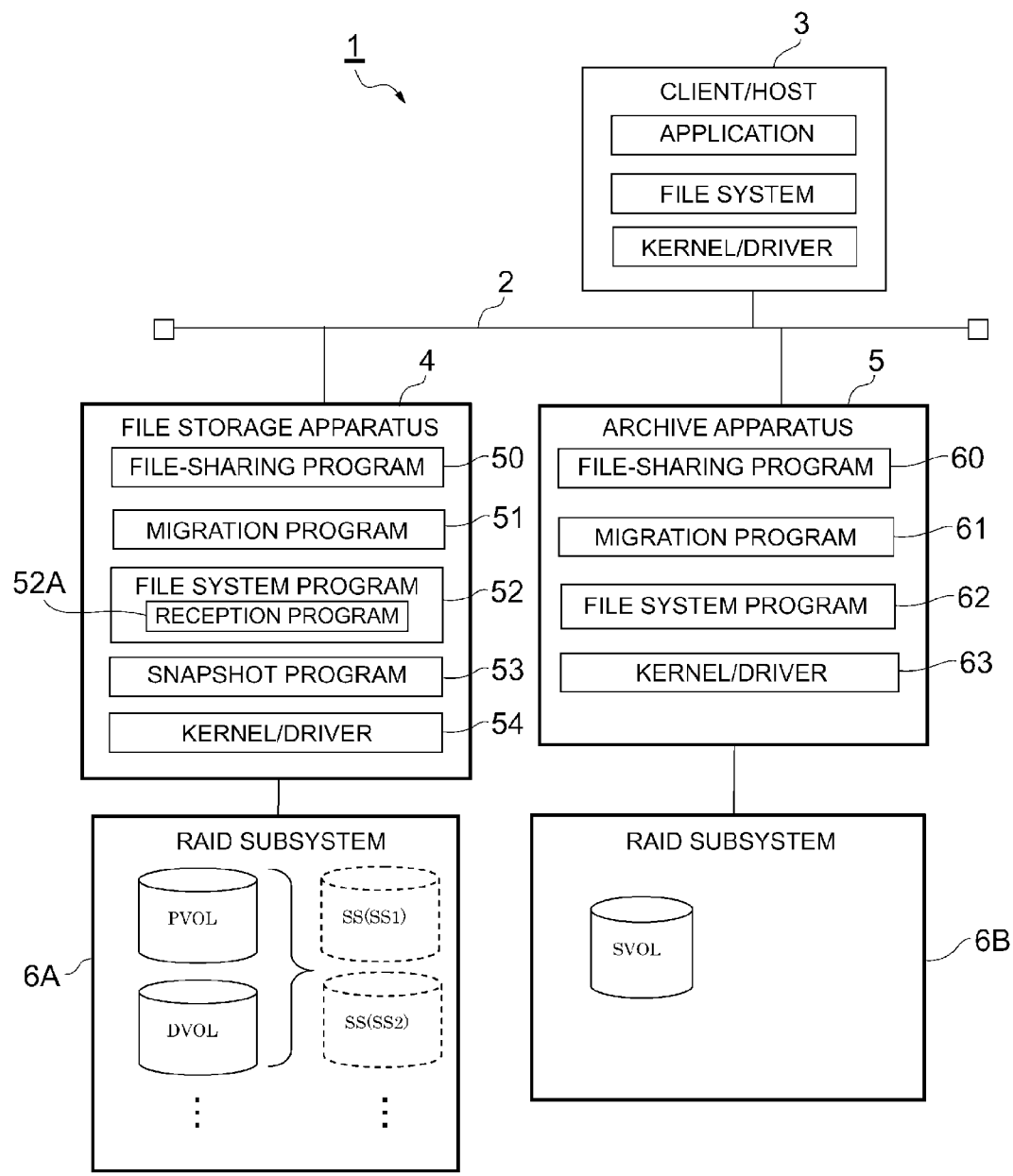
[FIG. 2] A block diagram showing a software configuration of the computing system according to the first embodiment.

FIG. 2 shows a software configuration of the computing system 1. In the computing system 1, a primary volume PVOL and a differential volume DVOL are formed in the first RAID subsystem 6A, and a secondary volume is formed in the second RAID subsystem 6B.

The primary volume PVOL is a logical volume VOL from/to which data is read and written by the client/host 3. The differential volume DVOL is a volume for acquiring a snapshot SS (SS1, SS2, . . . ) of all or a portion of the primary volume PVOL (the whole primary volume PVOL or file system data that is stored in the primary volume PVOL) and then, when the point of acquisition of the snapshot SS in the primary volume PVOL is updated, saving the data directly before the update (hereinafter suitably called "differential data") (such processing will suitably be referred to hereinafter as copy-on-write processing). Note that the snapshot SS refers to a static image of a target at a certain point in time (data of the logical volume VOL or file system, for example). The secondary volume SVOL is a volume for backing up files stored in the primary volume PVOL.

Meanwhile, installed on the file storage apparatus 4 are a file-sharing program 50, a migration program 51, a file system program 52, a snapshot program 53, and a kernel/driver 54. These programs are stored and saved in the memory 21A described earlier with reference to FIG. 1.

The file-sharing program 50 is a program providing file sharing services to the client/host 3 by using a communication protocol such as CIFS (Common Internet File System) or NFS (Network File System). Furthermore, the migration program 51 is a program for transferring backup target data saved in the first RAID subsystem 6A to the archive apparatus 5 from the file storage apparatus 4.

The file system program 52 is a program for managing a file system which is a logical structure constructed to implement managed units such as files on physical volumes. This file system program 52 includes a reception program 52A for updating and acquiring files upon receiving an access request from the file-sharing program 50. The reception program 52A transfers an access request to the archive apparatus 5 when an access target file does not exist in the file storage apparatus 4.

Figures 3, 4:
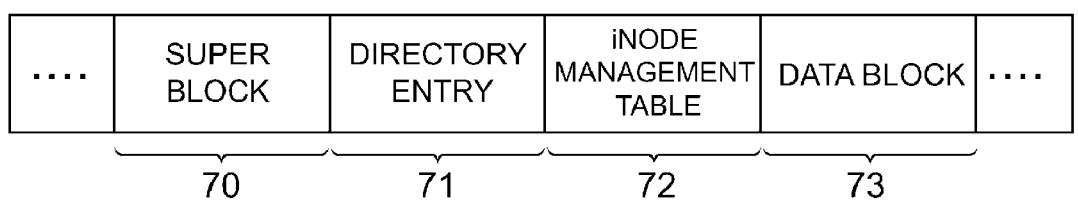
[FIG. 3] A conceptual view illustrating a file system.
[FIG. 4] A conceptual view of a directory entry configuration example.

To explain the file system here, the file system includes, as shown in FIG. 3, a super block 70, a directory entry 71, an Mode management table 72, and a data block 73. Of these elements, the super block 70 is a logical block in which information on the file system such as the size and amount of unused space of the file system is saved all together.

Furthermore, in the file system, management is carried out by mapping one Mode with one file, the resulting correspondence relationships being managed by the directory entry 71. Specifically, as shown in FIG. 4, the directory entry 71 is a table obtained by combining a directory path name 71A and an index indicating an Mode (hereinafter called an "Mode number") 71B.

Figure 5:
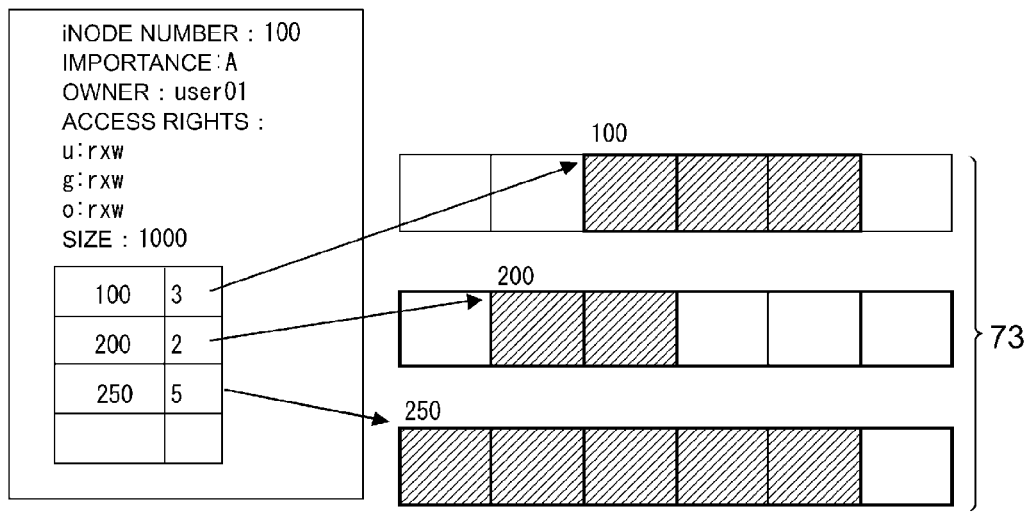
[FIG. 5] A conceptual view of an example in which an Mode refers to data blocks.
Figure 6:
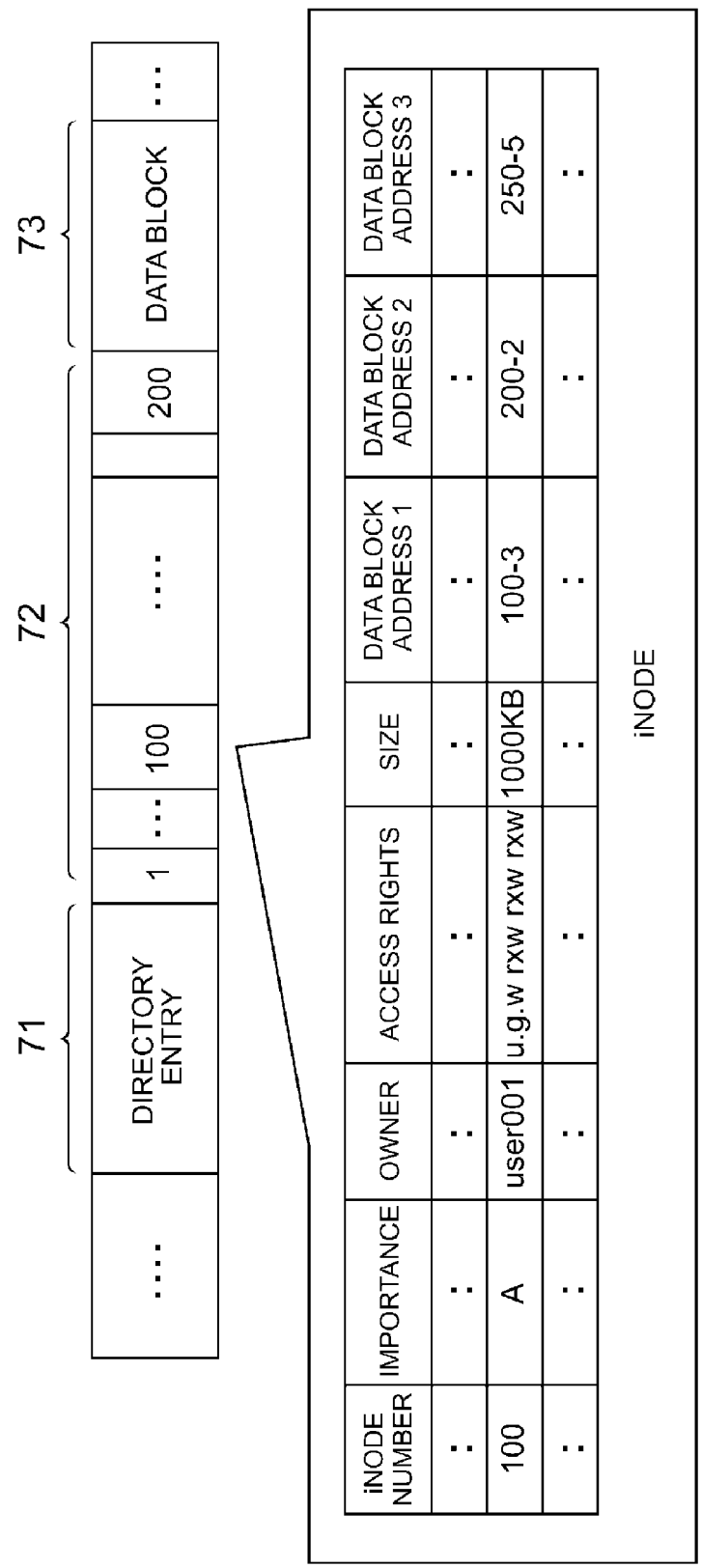
[FIG. 6] A conceptual view of the configuration of an Mode management table.
Figure 7:
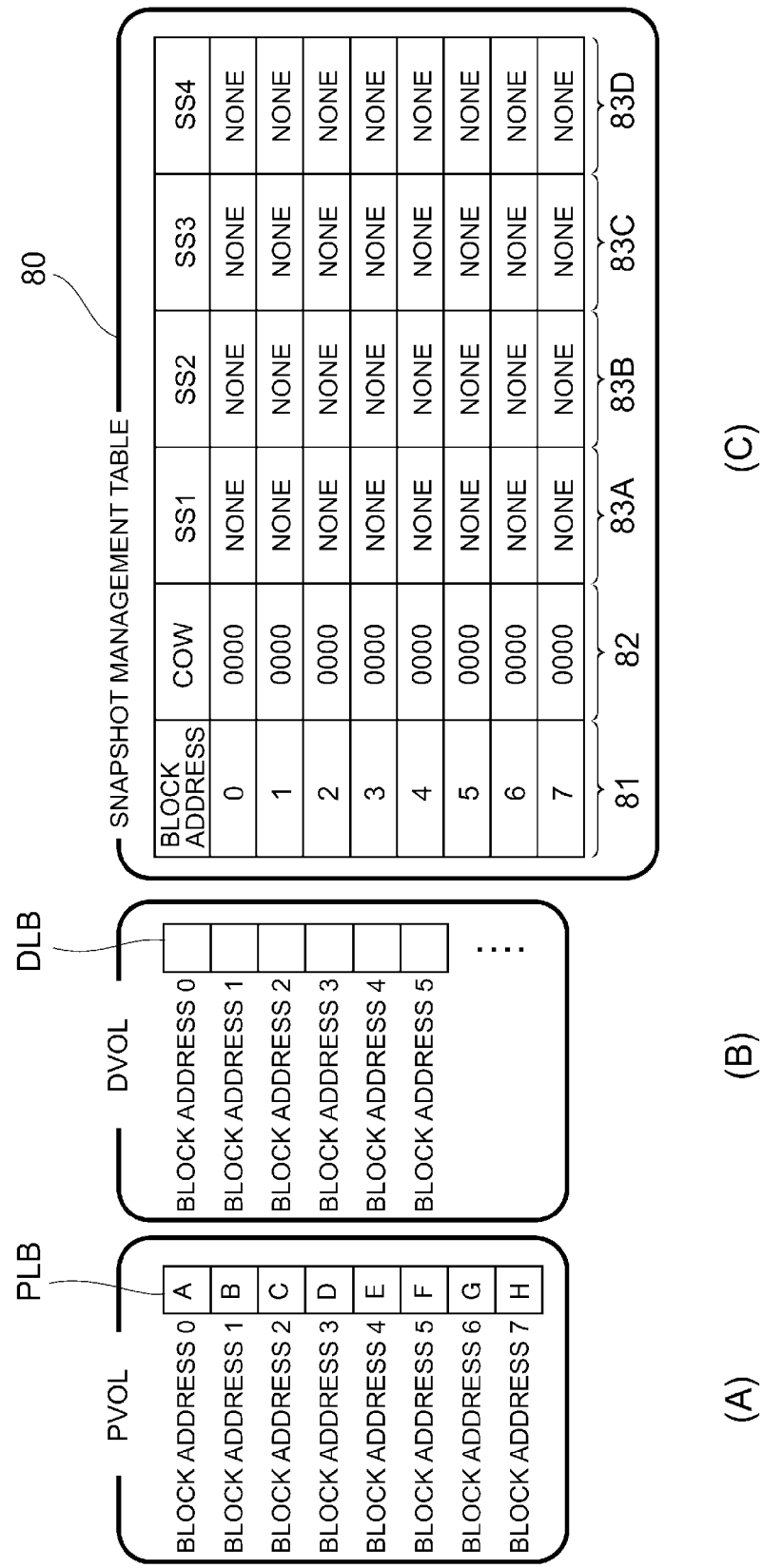
[FIG. 7]
Figure 8:
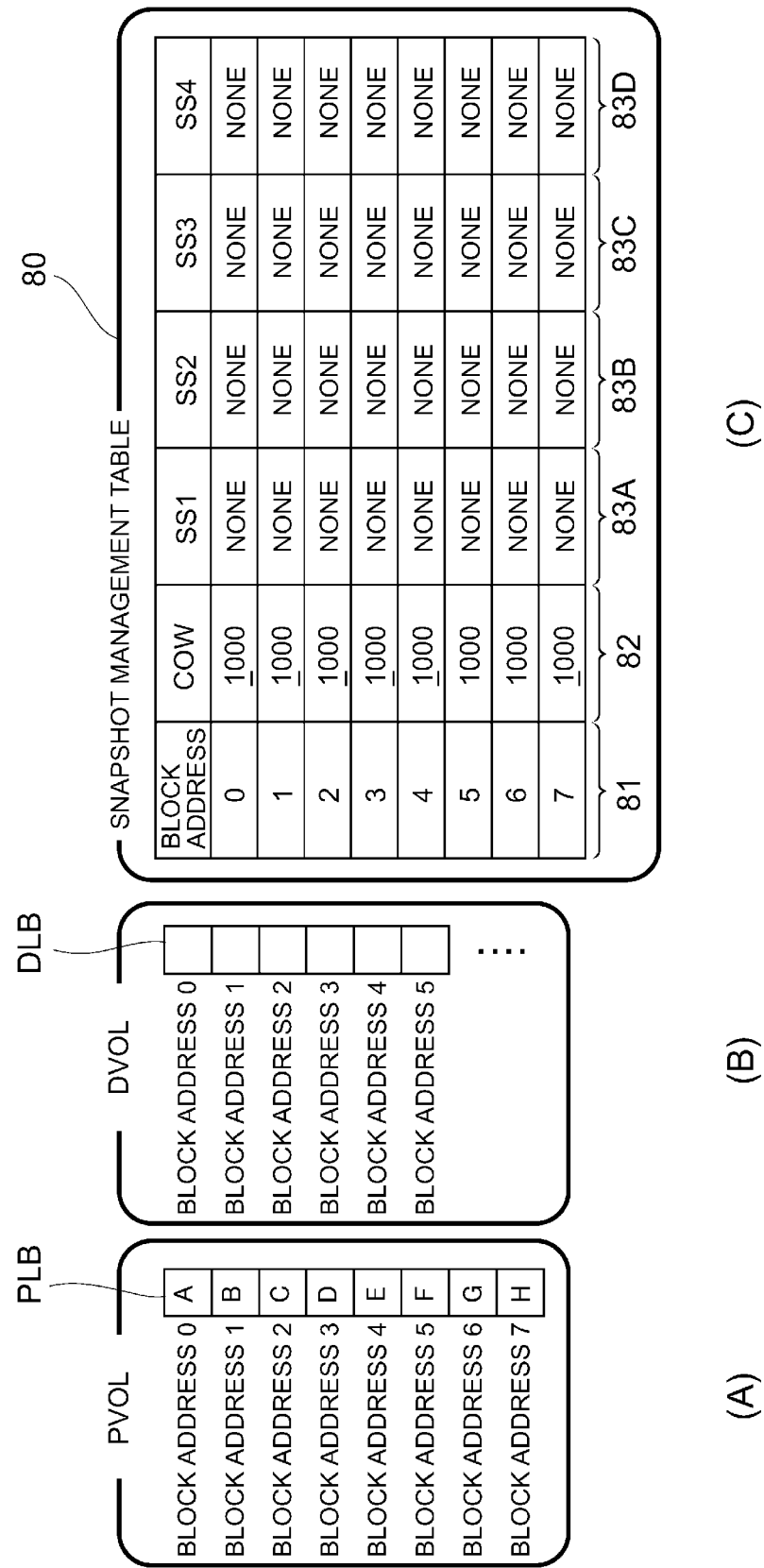
[FIG. 8]
Figure 9:
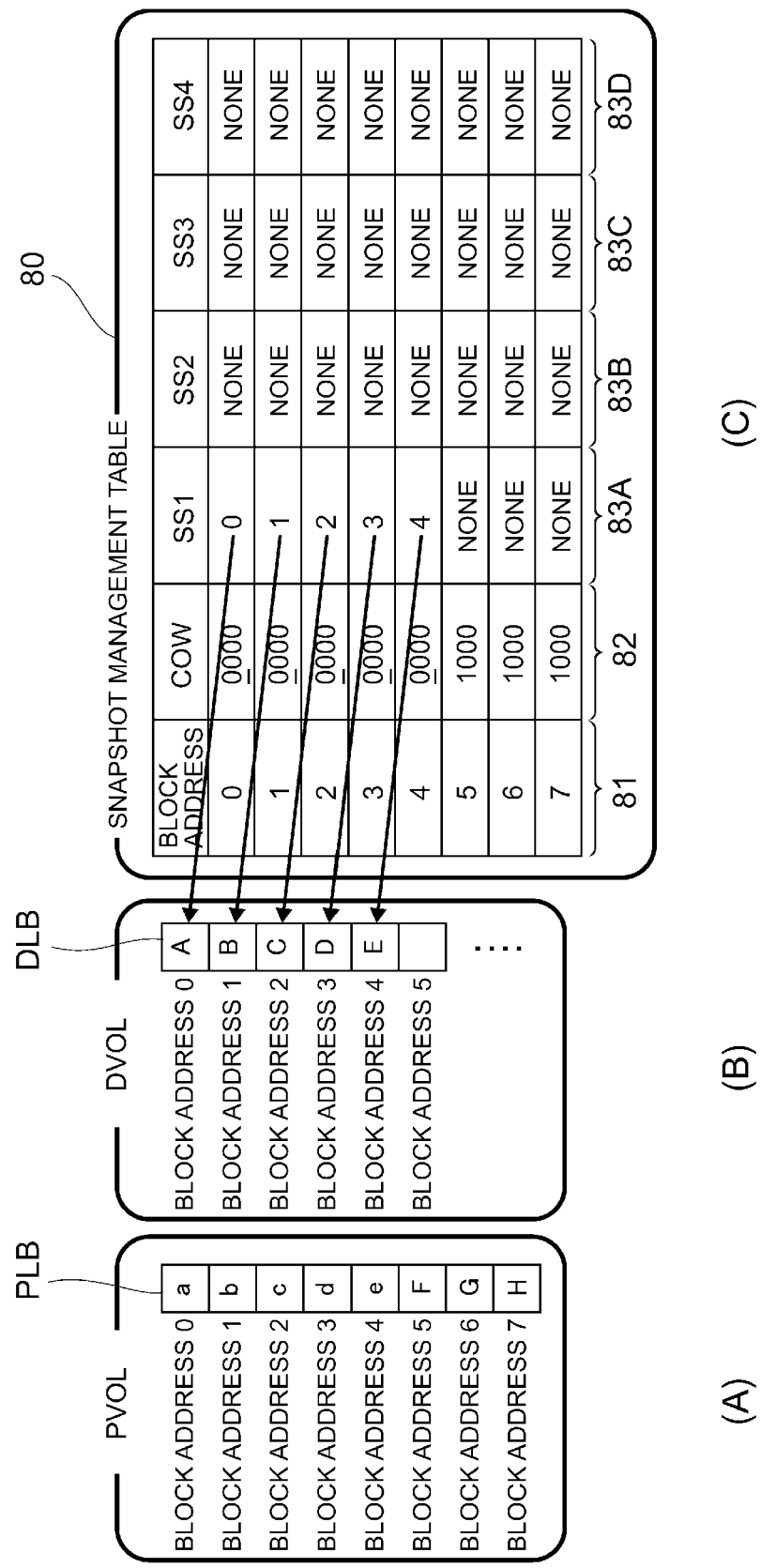
[FIG. 9]
Figure 10:
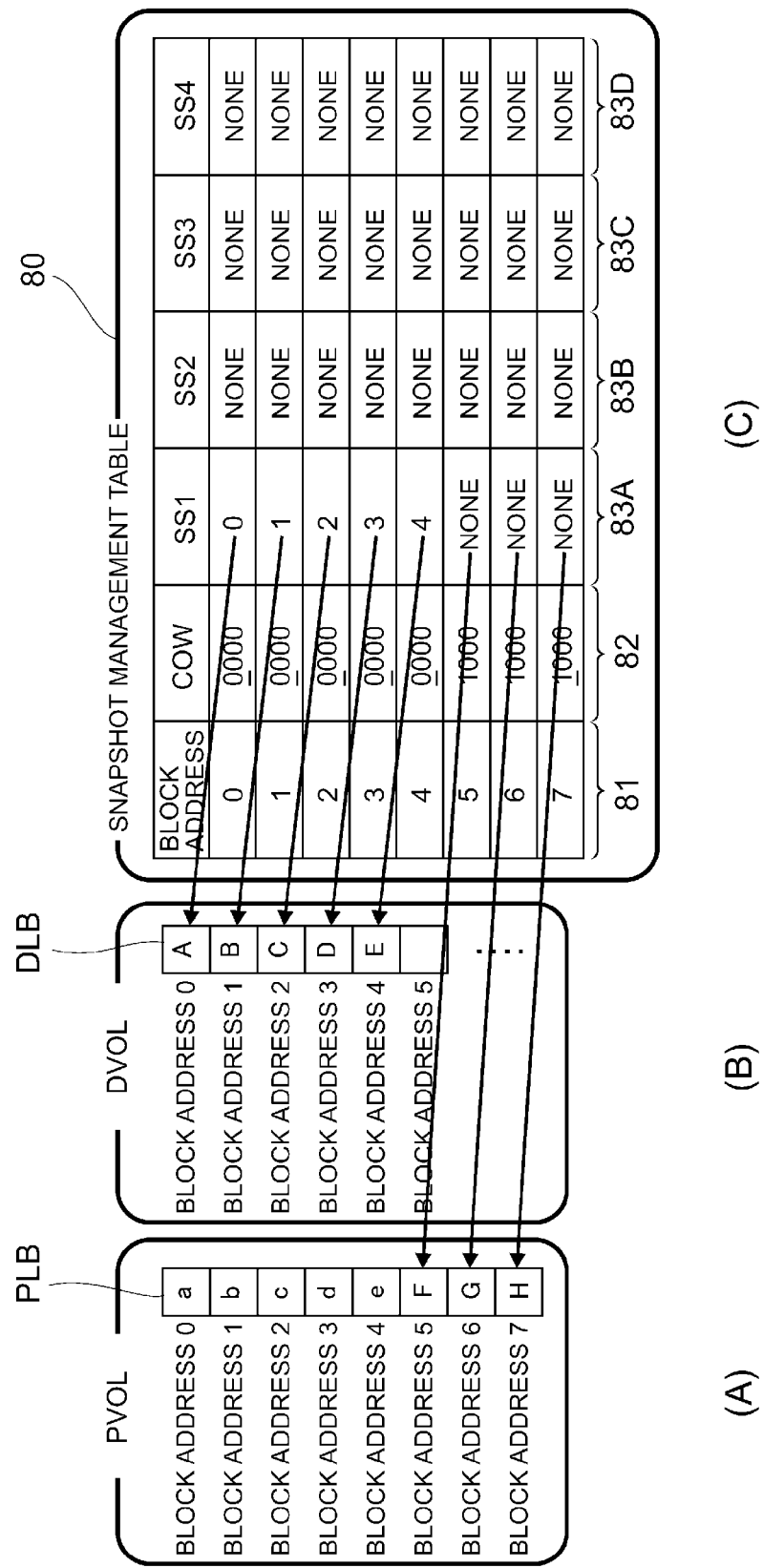
[FIG. 10]

An Mode indicates management information for the relevant file which includes information regarding ownership rights, access rights, file size and data storage location and so forth of the corresponding file, and is also known as "metadata." The referencing relationship between an Mode and the data block 73 is shown in FIG. 5. In the framed table on the left of FIG. 5, "100," "200," and "250" represent block addresses and "3," "2," and "5" indicate the numbers of consecutive data blocks 73 from the block address and in which blocks data is stored. iNodes of individual files are stored and managed in the iNode management table 72 as shown in FIG. 6, for example.

Returning to FIG. 2, the snapshot program 53 is a program for creating snapshots SS of the designated primary volume PVOL and file system data. The snapshot program 53 according to this embodiment is able to acquire snapshots SS of a plurality of generations. This type of snapshot program 53 will be described in detail subsequently.

Furthermore, the kernel/driver 54 handles interrupts by schedule control and hardware and so on of a plurality of programs (processes) running on the file storage apparatus 4, and carries out general control of the whole file storage apparatus 4 such as control to drive hardware and so on.

Meanwhile, the memory 31 (FIG. 1) of the archive apparatus 5 stores a file-sharing program 60, a migration program 61, a file system program 62, and a kernel/driver 63. The file-sharing program 60, migration program 61, file system program 62, and kernel/driver 63 are all programs with the same functions as the migration program 61, file system program 62 or kernel/driver 63 of the file storage apparatus 4, and therefore details will not be provided here.

(1-2) Differential Data Management Method During Snapshot Processing.

A differential data management method for when the snapshot program 53 of the file storage apparatus 4 acquires snapshots SS of a plurality of generations will be described next with reference to FIGS. 7 to 10. Note that, for the sake of simplification in the following description, it is assumed that there are up to eight logical blocks in the primary volume PVOL and differential volume DVOL and that up to four snapshots can be acquired. It is also assumed that, in an initial state, data "A" to "H" is stored in eight logical blocks PLD of the primary volume PVOL respectively.

In the case of this embodiment, in order to acquire snapshots SS of a plurality of generations, the memory 21A of the file storage apparatus 4 stores a snapshot management table 80 as shown in FIG. 7C. The snapshot management table 80 is a table in which, provided in correspondence with each of the logical blocks PLB of the primary volume PVOL, are a block address field 81, a copy-on-write field (hereinafter called a "COW field") 82 and a plurality of saving destination block address fields 83A to 83D respectively, as shown in FIG. 7C.

Each of the block address fields 81 stores the block addresses ("0" to "7") of corresponding logical blocks PLB in the primary volume PVOL respectively. In addition, each of the COW fields 82 stores bit strings (hereinafter called "COW bit strings") of the same number of bits as the number of snapshots that can be acquired. The bits of the COW bit strings each correspond to the first to fourth snapshots SS (SS1 to SS4) respectively in that order from the left, and are all initially set to "0" at which point snapshots SS have not been acquired.

Furthermore, four each of the saving destination block address fields 83A to 83D are provided in a single logical block PLB of the primary volume PVOL. These four saving destination block address fields 83A to 83D are made to correspond to the first to fourth snapshots SS respectively.

The saving destination block address fields 83A to 83D each store the block addresses of logical blocks DLB in the differential volume DVOL for saving differential data for the snapshot SS of the corresponding logical block (the logical block at the block address stored in the corresponding block address field 81) in the primary volume PVOL. However, when the differential data of the snapshot SS of the corresponding logical block PLB in the primary volume PVOL is not yet saved, that is, the writing of data to the logical block PLB in the snapshot SS has not yet been performed, these fields store a code "none" indicating that there is no corresponding saving destination logical block DLB.

Furthermore, upon receiving a request to acquire the first snapshot SS (SS1) (hereinafter called a "snapshot acquisition request"), the snapshot program 53 first switches the left-end bit associated with the first snapshot SS (SS1) to ON ("1") with respect to all the COW bit strings stored in the COW fields 82 of the snapshot management table 80 respectively, as shown in FIG. 8C. Thus, if the bits of the COW bit strings are "ON", this means that when data has been written to the corresponding logical block PLB in the primary volume PVOL, the data in the logical block PLB directly before writing is performed should be saved to the differential volume DVOL as differential data. The snapshot program 53 then waits until a data write request to write data to the primary volume PVOL is supplied.

Thereafter, as shown in FIG. 9A, for example, if a write request for updating to the data "a," "b," "c," "d," or "e" is supplied to the logical blocks PLB at block addresses "0" to "5" in the primary volume PVOL respectively, the snapshot program 53 saves to unused logical blocks PLB of the differential volume (in the example of FIG. 9B, the logical blocks DLB with the block addresses "0" to "4") by taking, as differential data, the data "A" to "E" stored in the logical blocks PLB at the block addresses "0" to "5" in the primary volume PVOL.

In addition, the snapshot program 53 stores the block addresses ("0" to "4" in this example) of each of the logical blocks DLB in the differential volume DVOL to which the corresponding differential data has been saved in each of the saving destination block address fields 83A (the saving destination block address fields 83A corresponding to the block addresses "0" to "4") that correspond to the logical blocks PLB subjected to the data update in a row associated with the first snapshot SS (SS1) in the snapshot management table 80. Furthermore, the snapshot program 53 reverts the left-end bit of each COW bit string stored in each of the corresponding COW fields 82 (COW fields 82 corresponding to the block addresses "0" to "4") in the snapshot management table 80 to OFF ("0").

If the corresponding bit of the COW bit string is reverted to OFF, even in cases where, following snapshot SS (SS1), a request to write data to the corresponding logical blocks PLB in the primary volume PVOL is supplied from the client/host 3, the copy-on-write processing is not performed. The snapshot program 53 then writes this data to the primary volume PVOL when this series of updates to the snapshot management table 80 is complete.

Furthermore, when a snapshot acquisition command of the second snapshot SS (SS2) is supplied, the snapshot program 53 then switches the second bit from the left end that is associated with the second snapshot SS (SS2) in the COW bit string stored in each COW field 82 of the snapshot management table 80 respectively to ON ("1") and executes the same processing.

Moreover, when a snapshot acquisition command of the third snapshot SS (SS3) is supplied, the snapshot program 53 then switches the third bit from the left end that is associated with the third snapshot SS (SS3) in the COW bit string stored in each COW field 82 of the snapshot management table 80 respectively to ON ("1") and executes the same processing.

Additionally, when a snapshot acquisition command of the fourth snapshot SS (SS4) is supplied, the snapshot program 53 then switches the bit on the right end that is associated with the fourth snapshot SS (SS4) in the COW bit string stored in each COW field 82 of the snapshot management table 80 respectively to ON ("1") and executes the same processing.

The processing content of the snapshot program 53 in a case where the snapshot SS reference request created earlier is then supplied from the client/host 3 will be described next. The primary volume PVOL and differential volume DVOL here are in the states in FIGS. 10A and 10B and the state of the snapshot management table 80 is the state of FIG. 10C.

Elements that are used during processing to reference the acquired snapshot SS are bits associated with the snapshots SS in each of the COW bit strings stored in the COW bit string fields 82 of the snapshot management table 80 respectively and data in the saving destination block address fields 83A to 83D in the row associated with the snapshot SS among the rows "SS1" to "SS4" in the snapshot management table 80.

When a request to refer to a snapshot SS created as mentioned earlier is supplied from the client/host 3, the snapshot program 53 reads the bit associated with the snapshot SS in the COW bit strings stored in each of the COW bit string fields 82 in the snapshot management table 80, in block address ("0" to "7") order. More specifically., the snapshot program 53 sequentially reads the left-end bit in the COW bit strings stored in each of the COW bit string fields 82 if a request to refer to the first snapshot SS, for example, is supplied.

If the bit read from the corresponding COW bit string field 82 is switched to ON ("1") as mentioned earlier for each block of the snapshot SS, the snapshot program 53 then reads the data of the logical block from the primary volume PVOL (refer to FIG. 13A) and maps this data with the corresponding logical block of the snapshot SS. In addition, if a bit read from the COW bit string field 82 is switched to OFF ("0"), the snapshot program 53 reads the data of the logical block from the differential volume DVOL (refer to FIG. 10B), and maps this data with the corresponding logical block of the snapshot SS. The designated snapshot SS can be realized by means of such mapping processing.

(1-3) Data Management Method According to this Embodiment (1-3-1) Overview and Configuration of Various Types of Management Tables The data management method of the computing system 1 will be explained next.

Figure 11:
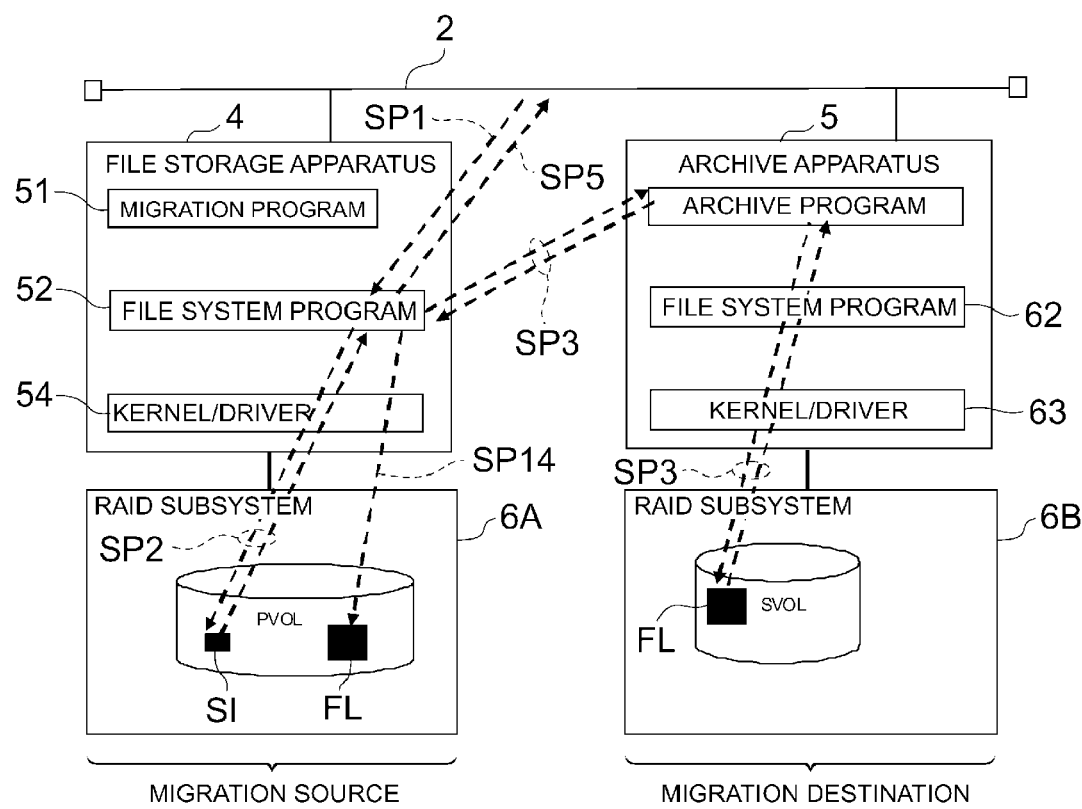
[FIG. 11] A conceptual view illustrating a conventional data management method.

As mentioned earlier, conventional recall processing is, as shown in FIG. 11, performed by way of five steps, namely, by receiving a read request (SP1), acquiring address information of the migration destination of a corresponding file FL from a stub file (SP2), then acquiring the file FL from a second RAID subsystem 6B which is the migration destination via the archive apparatus 5 (SP3), temporarily saving the acquired file FL in the primary volume PVOL in the first RAID subsystem 6A (SP4), and then transferring the file FL to the read request source (SP5). Note that FIG. 11 shows the flow of processed data in a case where conventional recall processing is performed in the computing system 1 according to this embodiment.

However, with this type of conventional data management method, if recall processing occurs frequently, the files FL read from the migration-destination second RAID subsystem 6B are accumulated in a large number in the primary volume PVOL, which depletes the capacity of the primary volume PVOL.

One method for solving this problem that may be considered is a method in which files FL that are temporarily saved in the primary volume PVOL are frequently deleted. However, according to this method, recall processing is performed frequently and on each occasion the file FL is transferred to the first RAID subsystem 6A which is the migration source from the second RAID subsystem 6B which is the migration destination, leading to deterioration in the response performance with respect to the file FL.

Therefore, according to this embodiment, data management is performed by means of a new data management method derived by combining the aforementioned conventional data management method shown earlier in FIG. 11 with a differential snapshot which is one backup method.

Figure 12:
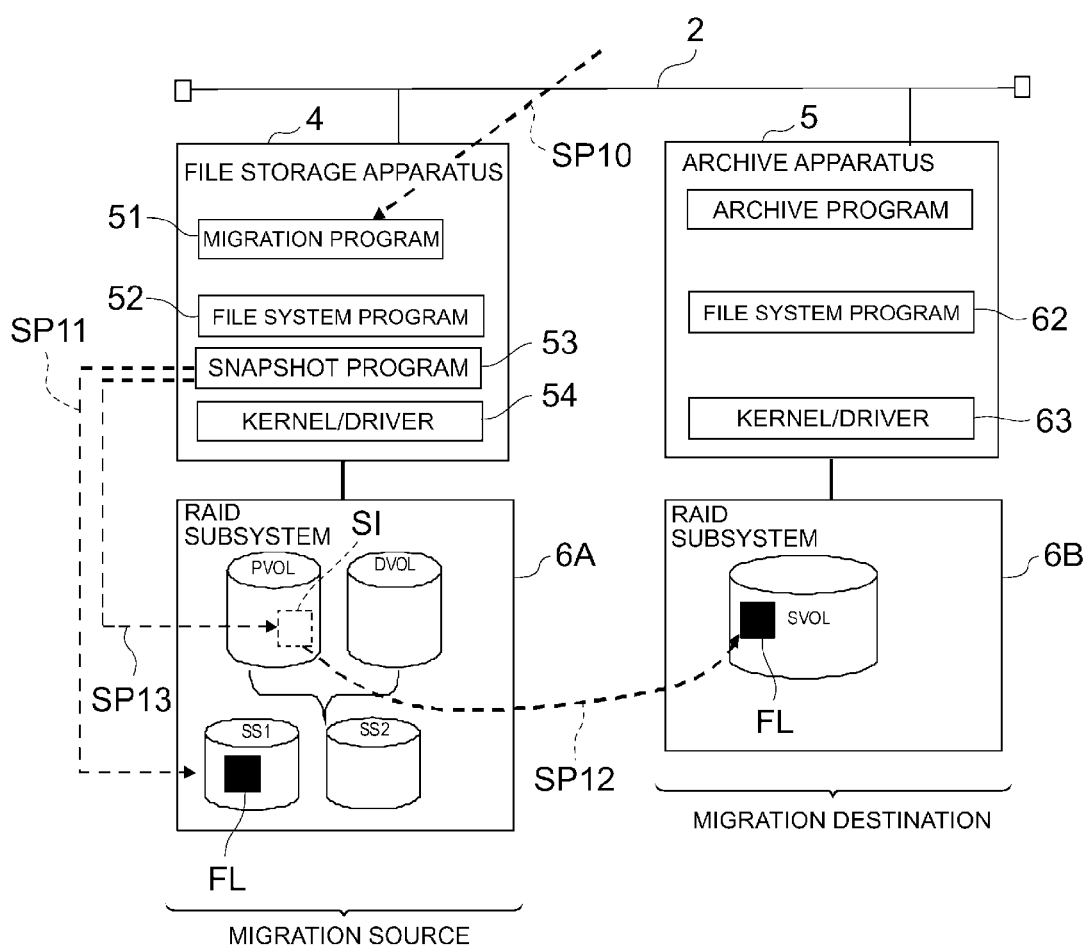
[FIG. 12] A conceptual view illustrating a data management method that combines a conventional data management method with a differential snapshot.

Specifically, as shown in FIG. 12, for example, if a migration request for a file FL is received (SP10), the file storage apparatus 4 causes the first RAID subsystem 6A to acquire a snapshot SS of the whole primary volume PVOL including the file FL or the corresponding file system data (this is suitably referred to hereinbelow as all or part of the primary volume PVOL) (SP11), migrates the file FL designated in the migration request to the secondary volume SVOL in the second RAID subsystem 6B via the network 2 and the archive apparatus 5 from the first RAID subsystem 6A (SP12), and then stores, in the first RAID subsystem 6A, a stub file SF of the file FL in the address position where the file FL is stored in the primary volume PVOL (SP13).

Figure 13:
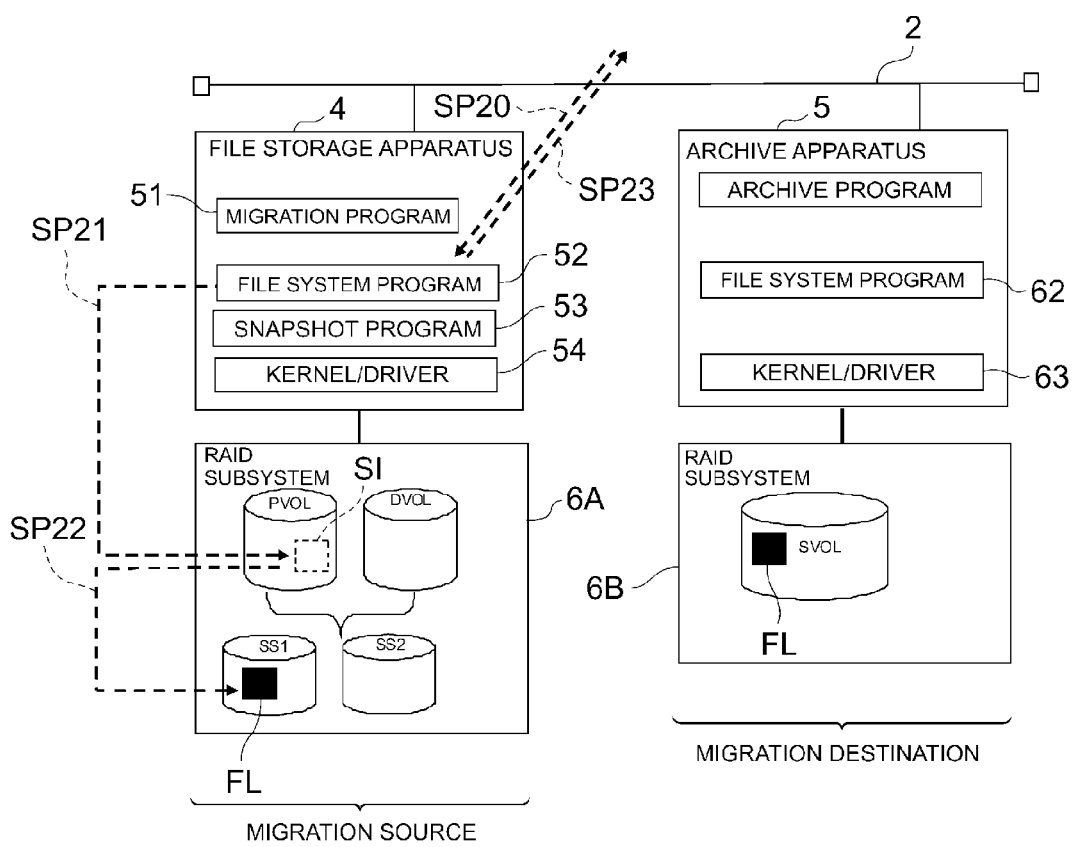
[FIG. 13] A conceptual view illustrating a data management method that combines a conventional data management method with a differential snapshot.

According to this method, as shown in FIG. 13, if an access request with respect to the file FL acquired by the snapshot SS is supplied to the file storage apparatus 4 from the client/host 3 (SP20), the file storage apparatus 4 is able to refer to the snapshot SS via the stub file SF (SP21 and SP22) and transfer the corresponding file FL to the client/host 3 (SP23), and hence there is the advantage that the access performance with respect to the backed up file FL can be improved while recall processing is avoided.

Figure 14:
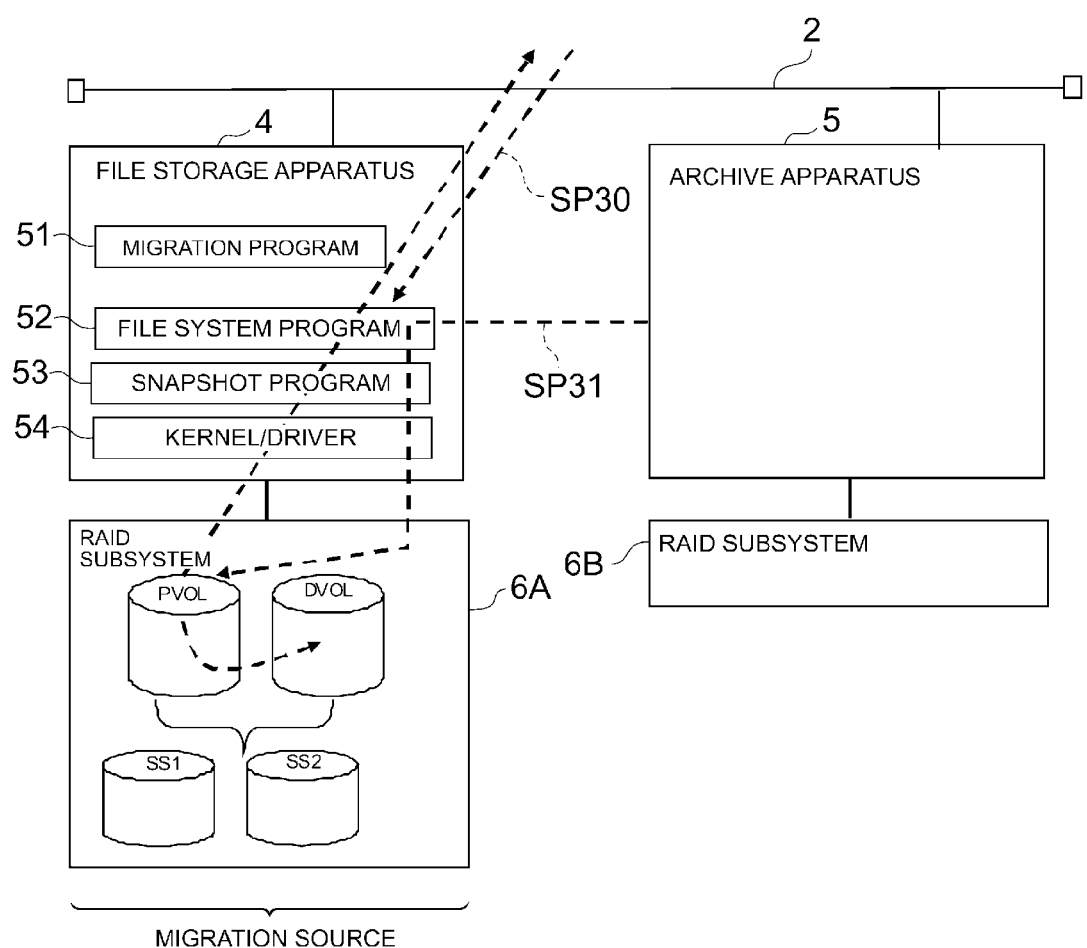
[FIG. 14] A conceptual view illustrating problems of a data management method that combines a conventional data management method with a differential snapshot.

However, such a data management method poses the problem of generating wasteful consumption of resources. In other words, with a data management method derived by combining a conventional data management method with a differential snapshot, when, as shown in FIG. 14, recall processing of the corresponding file FL is performed in accordance with a file reference request (SP30) from the client/host 3, the file FL must be temporarily saved in the migration-source primary volume PVOL (SP31) but here the data stored in the primary volume PVOL must be saved to the differential volume DVOL by the snapshot program 53 (undergo copy-on-write) before the file FL is stored in the primary volume PVOL.

Hence, when recall processing of a file FL that has not been acquired as a snapshot SS is a frequent occurrence, a copy-on-write process of the file FL temporarily saved in the primary volume PVOL is often generated, leading to the problem that the capacity of the differential volume DVOL is wastefully consumed.

Moreover, with the data management method derived by combining a conventional data management method and a differential snapshot, the number of snapshots SS acquired at regular intervals is also adversely affected. Specifically, although the acquisition of a snapshot SS is normally performed at regular intervals (P1, P2, in FIG. 15) in many cases, since the size of the management area for saving management data of the snapshot SS (specifically, the snapshot management table 80) is fixed, there is a finite quantity of snapshots SS that can be acquired (managed). Hence, supposing that a snapshot SS is acquired (SSP1, SSP2,) each time migration is executed, the number of snapshots that can be acquired at regular intervals is reduced, thus adversely affecting the original backup objective.

In addition, if the acquisition unit for a snapshot SS is the primary volume PVOL or file system data, the efficiency is poor when acquiring a snapshot SS of the whole primary volume PVOL or all the file system data for a high number of files FL that have been migrated to the second RAID subsystem 6B via the file storage apparatus 4 and the archive apparatus 5 from the first RAID subsystem 6A.

Hence, in this embodiment, the consumption amount of the differential volume DVOL generated by recall processing is monitored. Furthermore, if the files FL with which the differential volume DVOL is wastefully consumed by the recall processing are specified and snapshot SS acquisition is scheduled, deletion of the files FL is then prohibited until the scheduled time for acquiring the snapshot SS (hereinafter called the "scheduled snapshot acquisition time") and a snapshot SS including the files FL is acquired at the next scheduled snapshot acquisition time. Furthermore, by adding links pointing to the snapshot SS as address information to the stub file SF of the files FL, the generation of recall processing is prevented for those files FL and the consumption amount of the differential volume DVOL due to the recall processing is reduced.

Figures 15, 16:
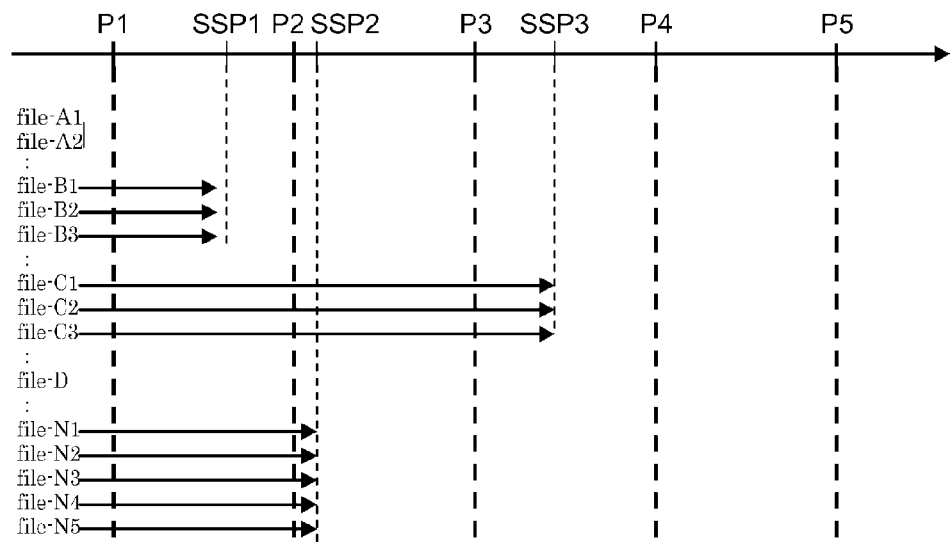
[FIG. 15] A conceptual view illustrating problems of a data management method that combines a conventional data management method with a differential snapshot.
[FIG. 16] A conceptual view illustrating a log file.

As means for executing the data management method according to this embodiment described hereinabove, a log file 90 shown in FIG. 16 is stored in the primary volume PVOL, and an Mode management table 91 shown in FIG. 17 is stored in the memory 21A of the file storage apparatus 4.

The log file 90 registers, for each file FL that is temporarily stored in the primary volume PVOL of the first RAID subsystem 6A by being read from the secondary volume SVOL of the second RAID subsystem 6B as a result of the recall processing, the date and time when the recall processing of the file FL was performed, the file path name representing the location where the files FL are saved in the second RAID subsystem 6B, and the size (hereinafter referred to as the differential volume consumption size) in the differential volume DVOL consumed by the file FL as a result of the acquisition of regular or irregular snapshots SS.

Furthermore, in addition to information such as the ownership rights and access rights and so forth described earlier with reference to FIG. 6, the Mode management table 91 also includes a WORM (Write Once Read Many) attribute of the corresponding file FL, a flag indicating whether or not a snapshot is to be acquired (hereinafter referred to as a "snapshot necessity flag"), and information indicating a link destination (called "link destination information" hereinbelow).

A WORM attribute is an attribute indicating whether or not the corresponding file FL is a WORM file (a file that cannot be rewritten simply by being referenced) and is set to "ON" if the file FL has been converted to a WORM file, and set to "OFF" if the file FL can be updated.

Furthermore, the snapshot acquisition flag is a flag indicating whether or not the snapshot SS of the recalled file FL is required and is set to "ON" if required and set to "OFF" if unnecessary. The snapshot acquisition flag is set to OFF as a default value when the corresponding file FL is recalled.

In addition, the address of the reference destination (link destination) of the corresponding file FL is registered where necessary as link destination information. Note that a reference destination of the file FL is the archive apparatus 5 (more accurately, the second RAID subsystem 6B), within the primary volume PVOL, and a snapshot SS of the file FL.

Note that the stub file SF according to this embodiment is configured from information that is identical to the corresponding single entry in the Mode management table 91 shown in FIG. 17.

FIGS. 18 to 22 show the flow of a series of processes of the data management method according to this embodiment in a case where the recall target is a WORM file.

Figure 18:
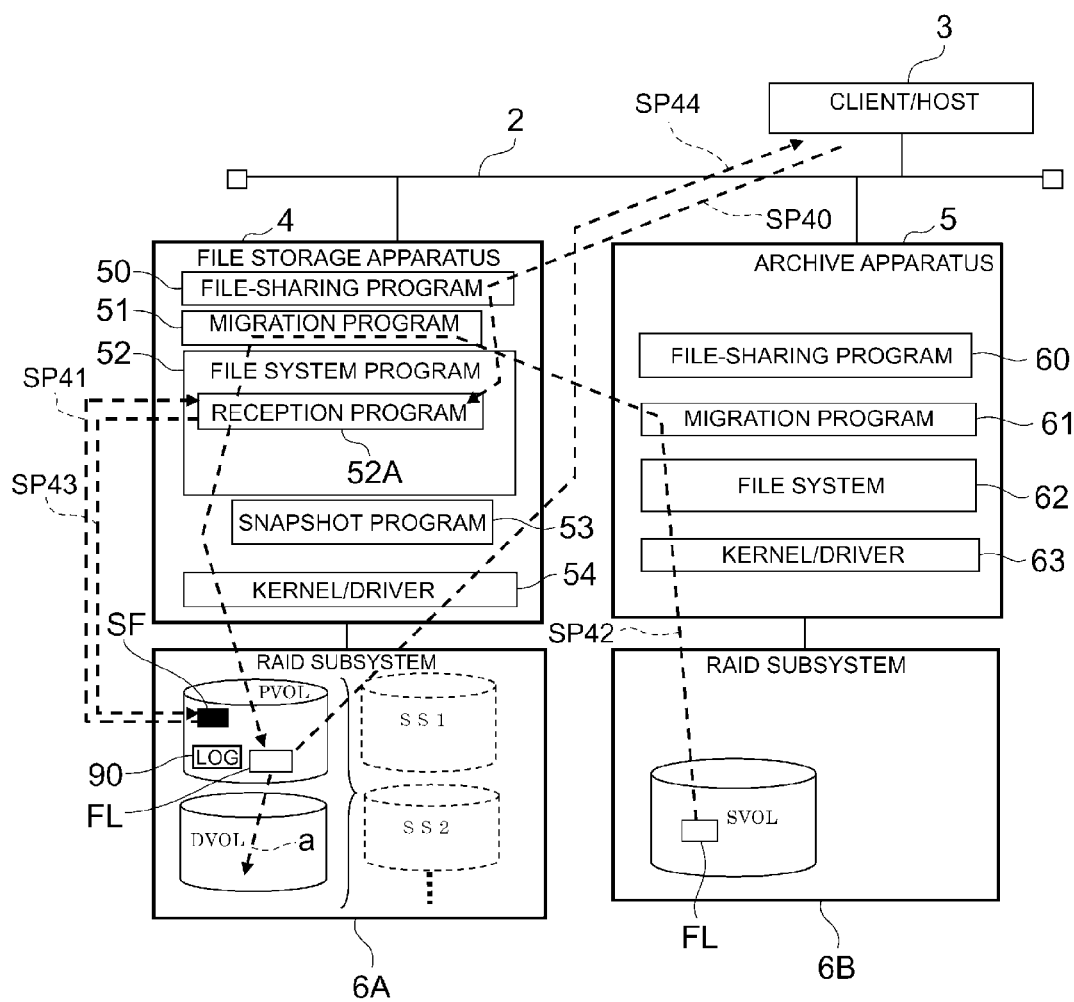
[FIG. 18] A conceptual view illustrating data management processing according to the embodiment in a case where the recall target is a WORM file.

As shown in FIG. 18, in the file storage apparatus 4, when an access request is received from the client/host 3, a corresponding access request (read request) is supplied from the file-sharing program 50 to the reception program 52A of the file system program 52 (SP40).

The reception program 52A accesses a storage area designated as the access destination by the received access request and, based on information stored in the storage area, determines whether or not recall processing is required (SP41). Specifically, if a stub file SF is stored in a storage area that is designated as the access destination by this access request, the reception program 52A refers to a link destination within the stub file SF and, if the archive apparatus 5 has been registered as the link destination of the file FL, determines that recall processing is required, and otherwise determines that recall processing is not required. Furthermore, the reception program 52A also determines that recall processing is not required in cases where a corresponding file FL is stored in the storage area designated in the access request as the access destination.

Further, if it is determined in this determination that recall processing is required, the reception program 52A acquires the file FL from the migration-destination secondary volume SVOL in the second RAID subsystem 6B via the archive apparatus 5 and stores the acquired file FL as a temporary file in the migration source primary volume PVOL (SP42). The reception program 52A then additionally registers the storage location of the file FL in the primary volume PVOL as the link destination of the file FL in the stub file SF that corresponds to the file FL (SP43), and then transfers the file FL to the client/host 3 which is the access request source (SP44).

Figure 19:
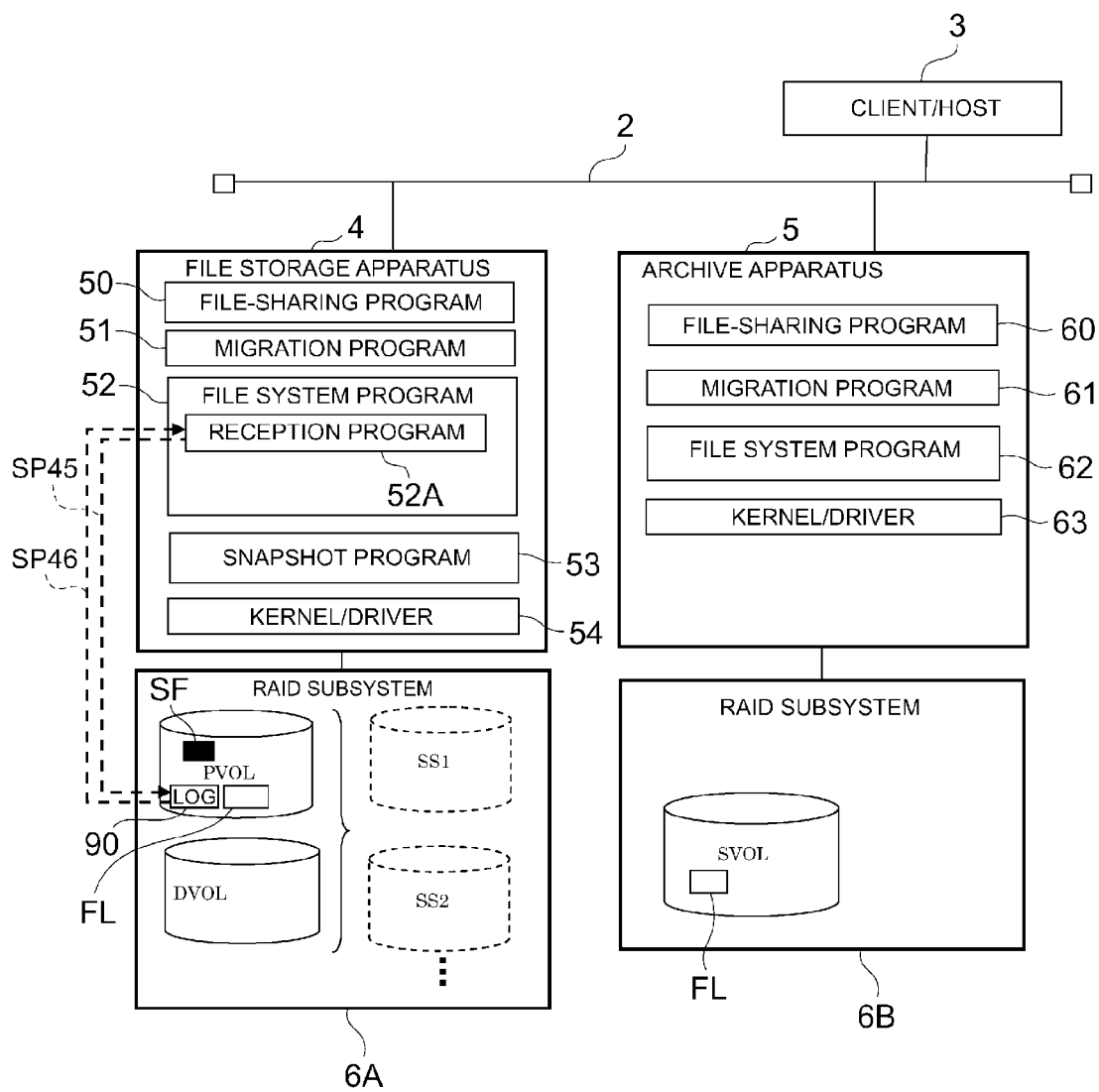
[FIG. 19] A conceptual view illustrating data management processing according to the embodiment in a case where the recall target is a WORM file.

Furthermore, the reception program 52A determines the capacity of the differential volume DVOL that is consumed by the saving (arrow a) of data to the differential volume DVOL from the primary volume PVOL which occurs as a result of storing the file FL in the primary volume PVOL in step SP42 and, as shown in FIG. 19, stores the required information including the capacity thus determined in the log file 90 (SP45).

The reception program 52A then refers to the log file 90 and determines whether or not a file FL for which the consumption size of the differential volume DVOL (referred to hereinbelow as the "differential volume consumption size threshold") exceeds a predetermined threshold (hereinafter called the "differential volume consumption size") (SP46). Note that the differential volume consumption size threshold may be any absolute value set in accordance with a fixed value common to all the files FL and the file size of each file FL.

In addition, in step SP46, in cases where a plurality of logs exist for the same file FL, the reception program 52A compares a value obtained by adding up the differential volume consumption sizes of this plurality of logs with the differential volume consumption size threshold as the differential volume consumption size of the file FL. It is therefore highly likely that the differential volume consumption size will exceed the differential volume consumption size threshold for files FL for which recall due to file access occurs frequently.

Furthermore, the reception program 52A sets the snapshot acquisition flag of the file FL in the Mode management table 91 (FIG. 17) to "ON" for files FL for which the differential volume consumption size exceeds the differential volume consumption size.

Figure 20:
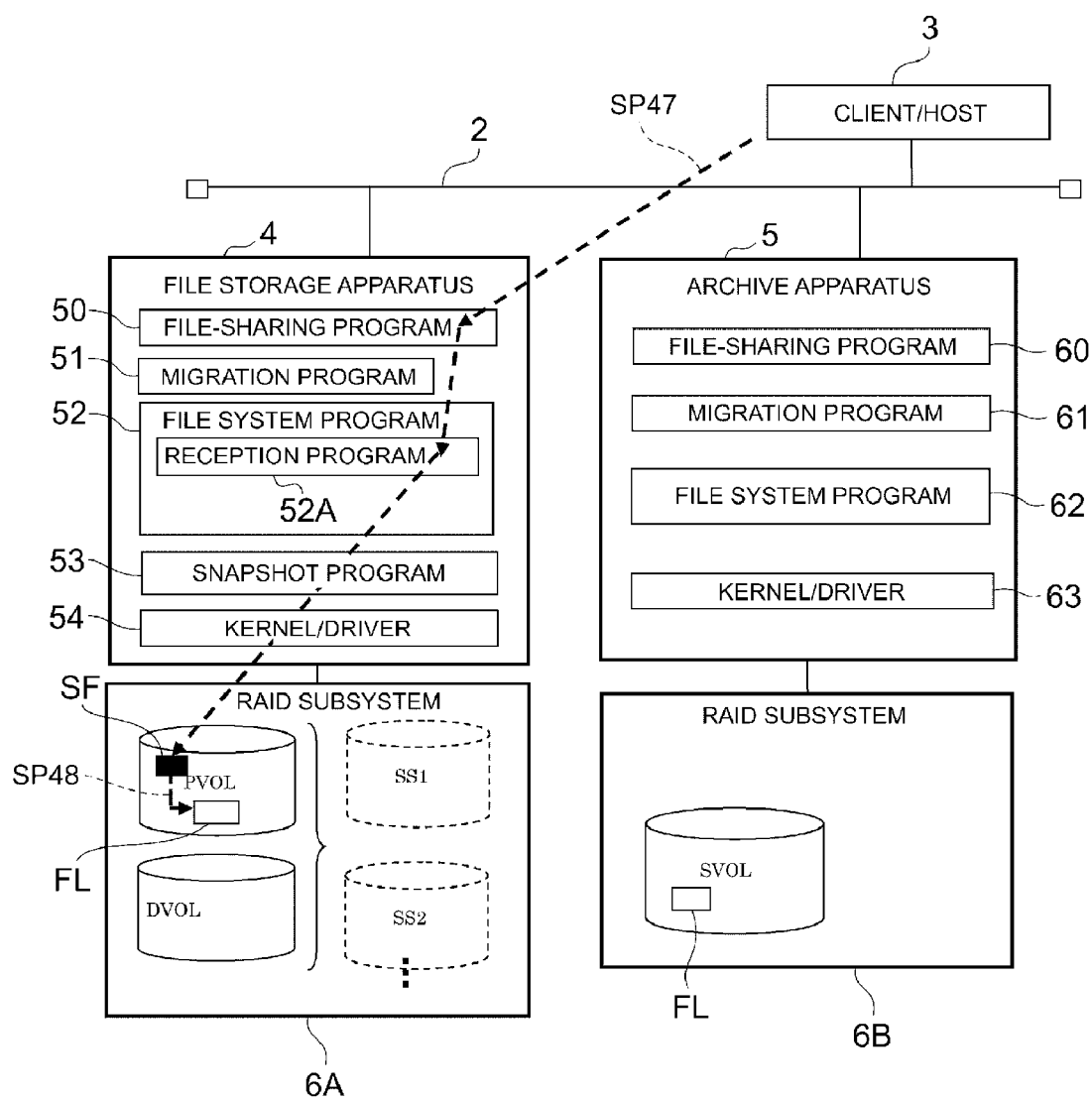
[FIG. 20] A conceptual view illustrating data management processing according to the embodiment in a case where the recall target is a WORM file.

In addition, the reception program 52A monitors the state of access by the user to each file FL that is temporarily stored in the primary volume PVOL due to recall processing and, as shown in FIG. 20, if the last user among the users accessing the file FL terminates access (receives, via the file-sharing program 50, a close request to close the file FL sent from the corresponding client/host 3), the reception program 52A checks the snapshot acquisition flag of the file FL (SP47). Furthermore, if the snapshot acquisition flag is set to "OFF", the reception program 52A deletes the file FL from the primary volume PVOL (SP48).

Figure 21:
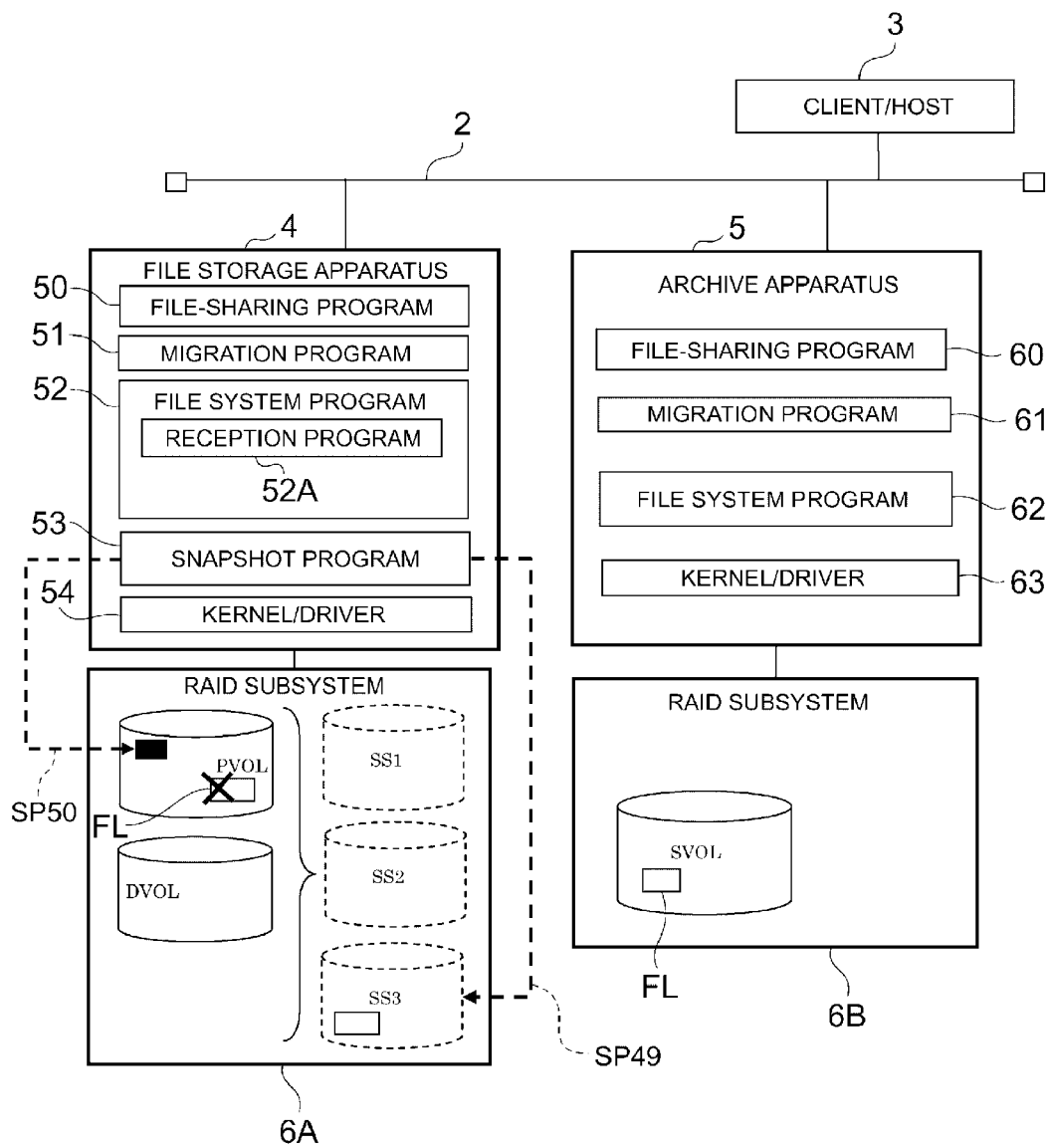
[FIG. 21] A conceptual view illustrating data management processing according to the embodiment in a case where the recall target is a WORM file.

However, when, as shown in FIG. 21, a time that is preset by the system administrator or the like is reached, the snapshot program 53 acquires a snapshot SS of files for which the snapshot acquisition flag is set to "ON" (SP49). Furthermore, the snapshot program 53 records a link pointing to the snapshot SS of the file FL for which the snapshot SS was acquired in the stub file SF of the file FL (SP50), and then deletes the file FL from the primary volume PVOL.

Figure 22:
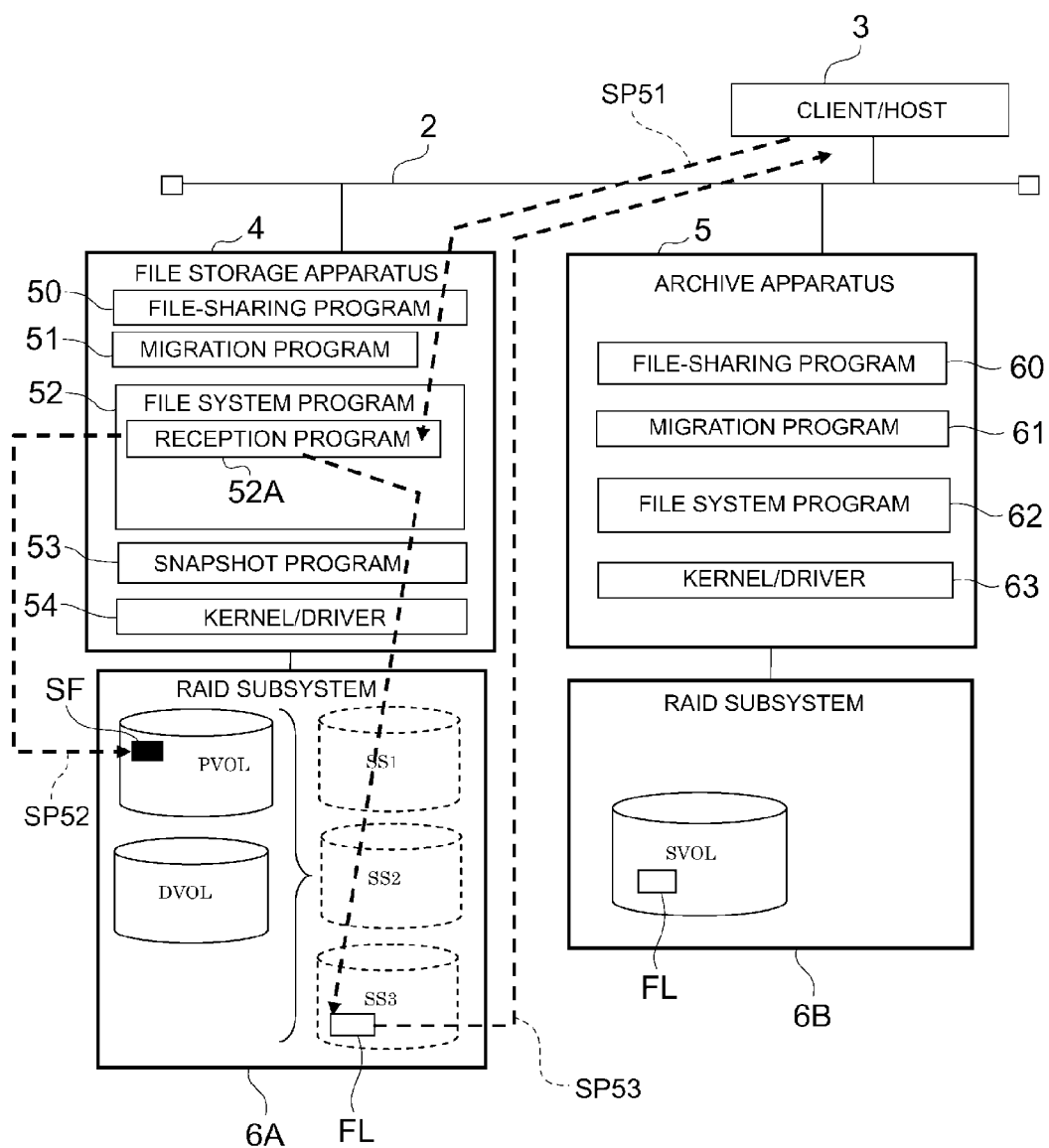
[FIG. 22] A conceptual view illustrating data management processing according to the embodiment in a case where the recall target is a WORM file.

Meanwhile, as shown in FIG. 22, when the reception program 52A then receives an access request (read request) from the client/host 3 (SP51), the reception program 52A accesses the storage area designated as the access destination in the access request and, based on the information stored in the storage area, determines whether or not recall processing is required (SP52). The specific method of determination used in step SP52 is the same as for the case mentioned earlier with respect to step SP41 in FIG. 18.

If a stub file SF is stored in the storage area designated as the access destination in the access request and if a snapshot SS is registered as the link destination of the file FL in the stub file SF, the reception program 52A then generates (regenerates) the file FL on the basis of corresponding data stored in the primary volume PVOL and the differential volume DVOL (SP52), and transfers the generated file FL to the client/host 3 which is the access request source (SP53). It is accordingly possible to effectively prevent the generation of copy-on-write processing due to recall processing and prevent a drop in response caused by migrating the file FL to the first RAID subsystem 6A from the second RAID subsystem 6B via the archive apparatus 5 and file storage apparatus 4.

However, FIGS. 23 to 27 show the flow of a series of processes in the data management method according to this embodiment in a case where the recall target is a normal file FL and not a WORM file.

Figure 23:
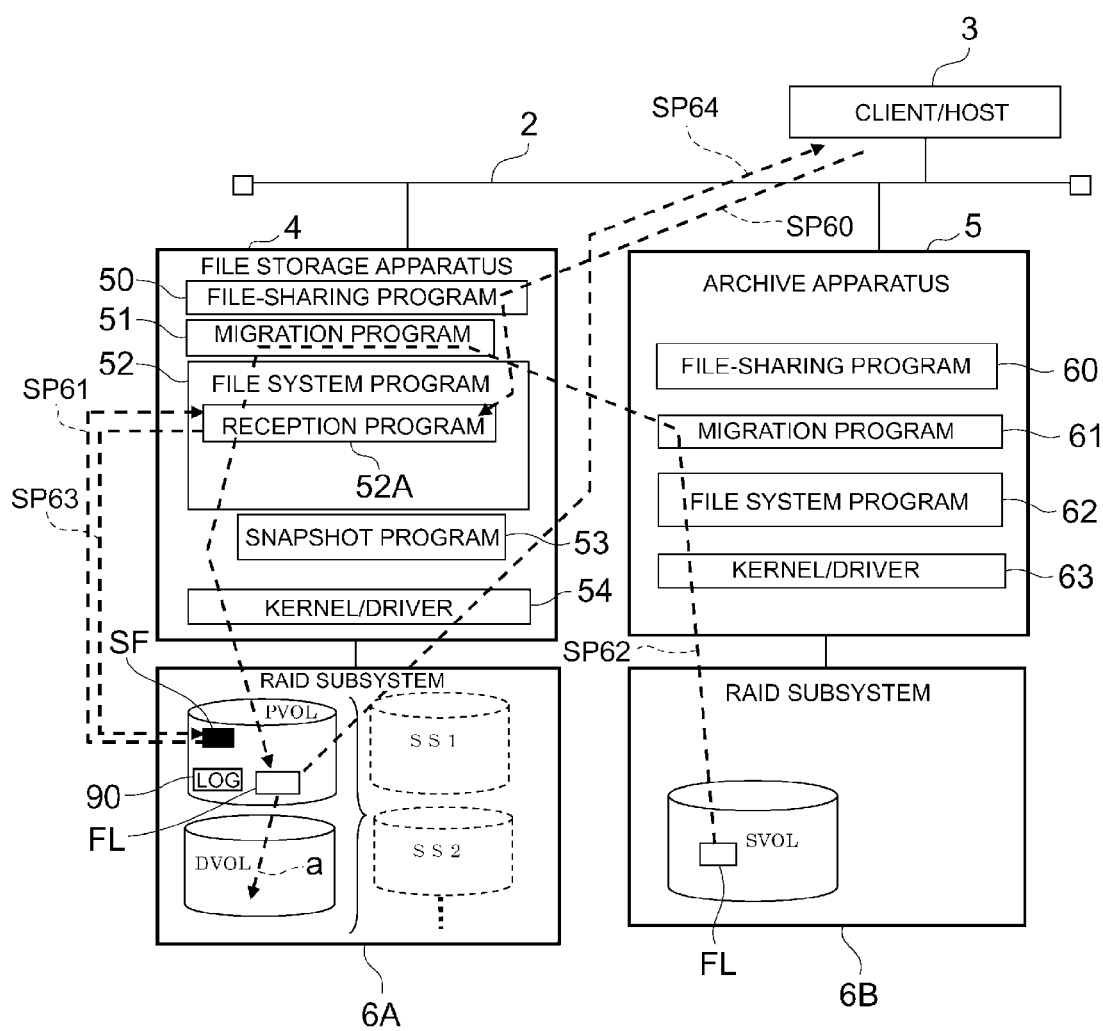
[FIG. 23] A conceptual view illustrating data management processing according to the embodiment in a case where the recall target is a normal file.
Figure 24:
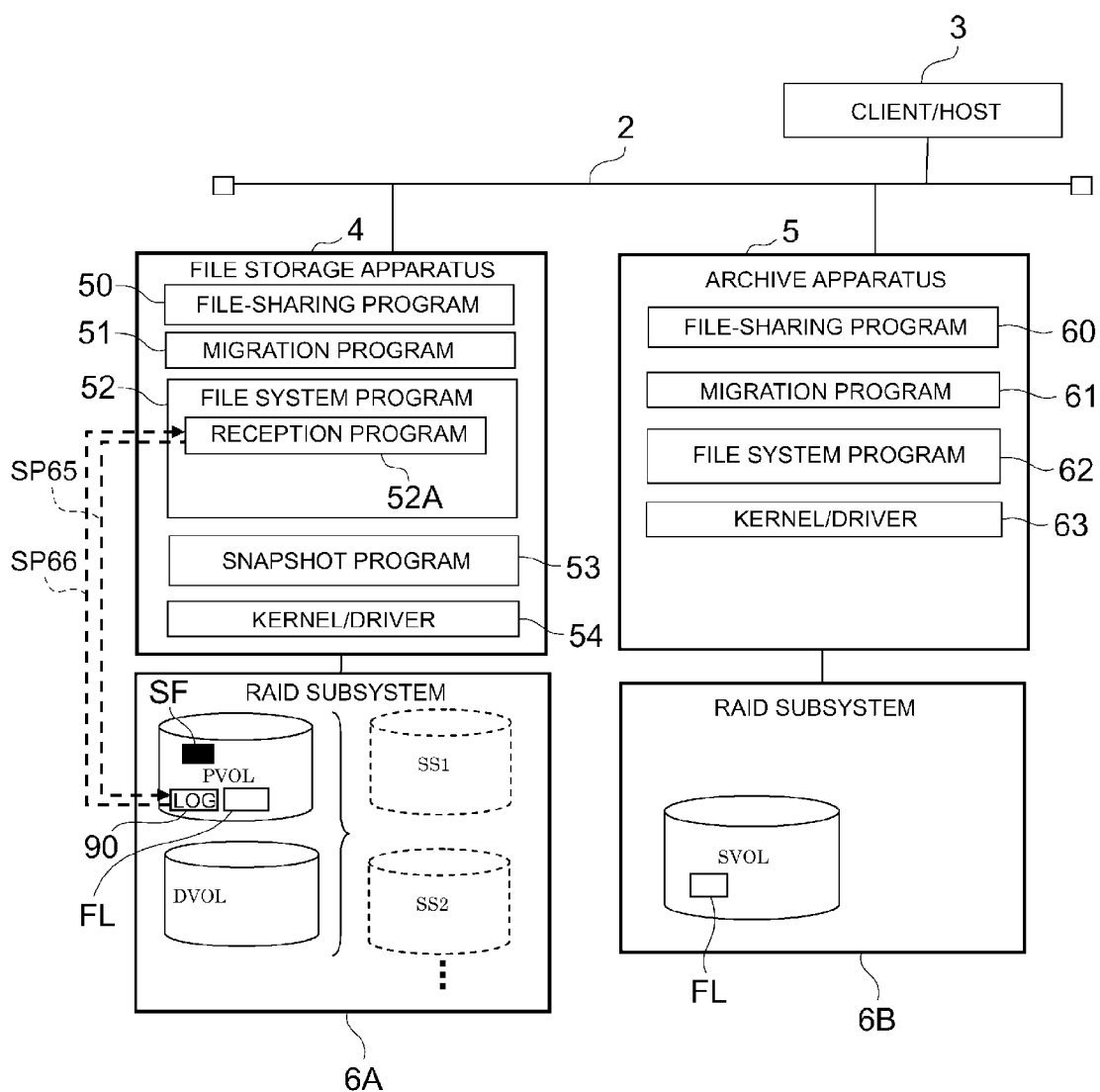
[FIG. 24] A conceptual view illustrating data management processing according to the embodiment in a case where the recall target is a normal file.
Figure 25:
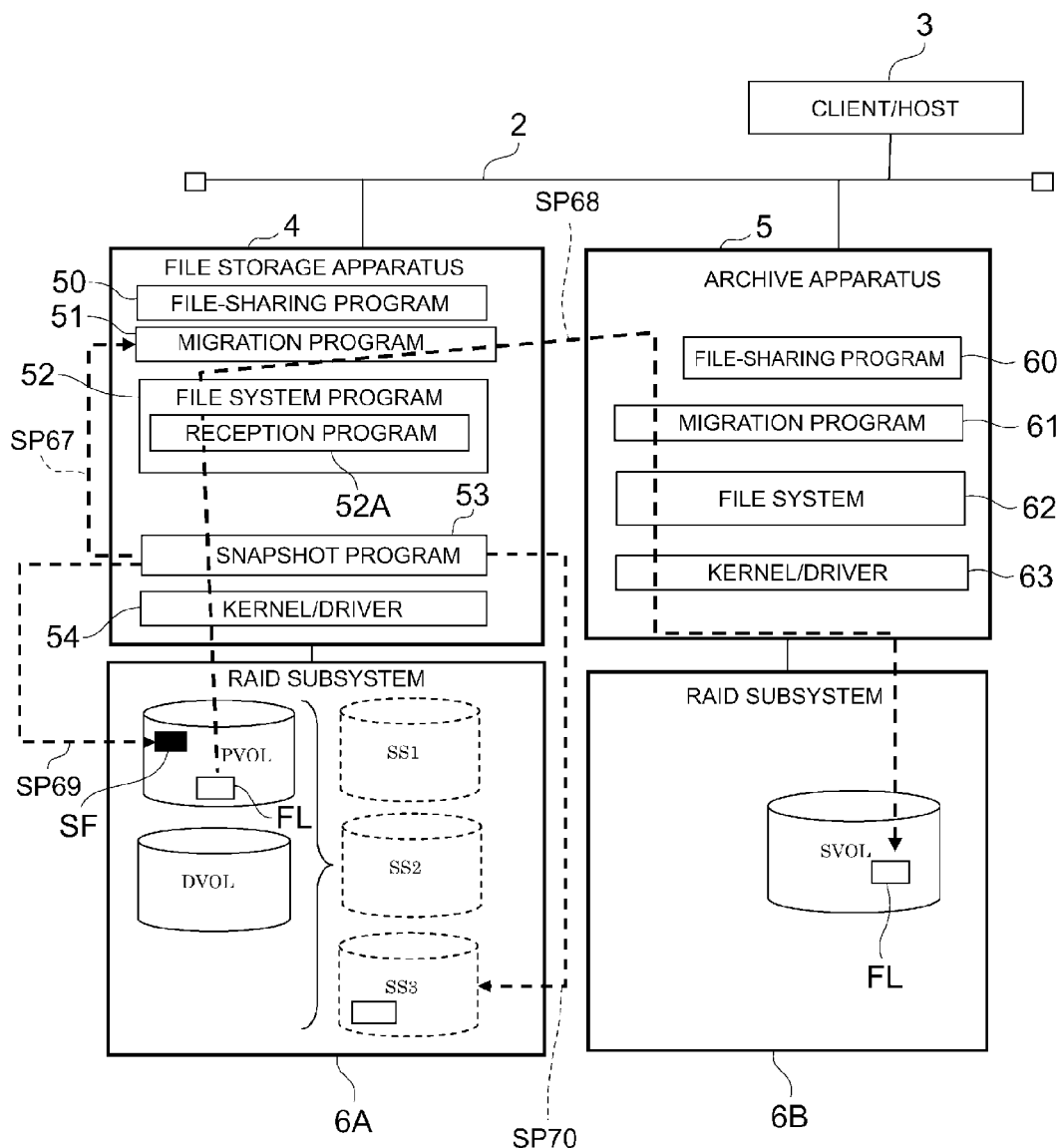
[FIG. 25] A conceptual view illustrating data management processing according to the embodiment in a case where the recall target is a normal file.

In this series of processes, the processing of steps SP60 to SP66 of FIGS. 23 and 24 respectively is like the processing of steps SP40 to SP46 mentioned earlier with respect to FIGS. 18 and 19 and therefore is not described here.

Meanwhile, when a snapshot acquisition time preset by the system administrator or the like is reached, the snapshot program 53 refers to the Mode management table 91 (FIG. 17) and determines whether or not there is a file FL for which the snapshot acquisition flag has been set to "OFF." If such a file FL is present, the snapshot program 53 then asks the migration program 51 to migrate the file FL to the archive apparatus 5 (SP67). Under the control of the migration program 51, this file FL is migrated from the first RAID subsystem 6A to the second RAID subsystem 6B via the file storage apparatus 4 and the archive apparatus 5 (SP68).

The snapshot program 53 subsequently changes the link destination in the stub file SF of the file FL that has been migrated from the first RAID subsystem 6A to the second RAID subsystem 6B in step SP68 (file for which the snapshot acquisition flag has been set to "OFF") to the archive apparatus 5 (SP69). The snapshot program 53 then deletes the files FL for which the snapshot acquisition flag has been set to "OFF" from the primary volume PVOL and then acquires a snapshot SS of the primary volume PVOL or required file system data stored in the primary volume PVOL (SP70).

Figure 26:
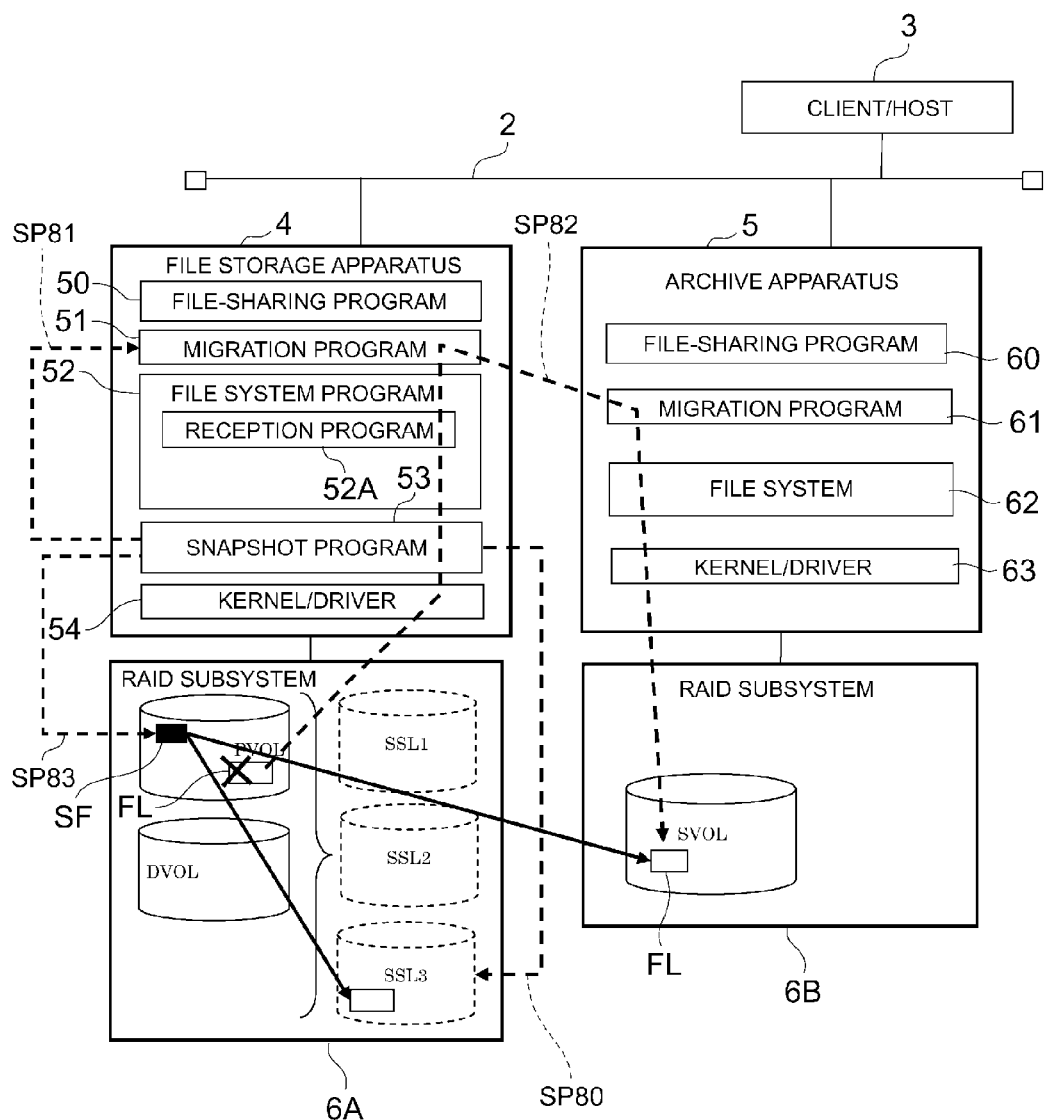
[FIG. 26] A conceptual view illustrating data management processing according to the embodiment in a case where the recall target is a normal file.

However, if no file FL for which the snapshot acquisition flag has been set to "OFF" exists in the Mode management table 91 (FIG. 17) that is referred to directly after the snapshot acquisition time is reached, the snapshot program 53 acquires a snapshot SS of the subject primary volume PVOL or file system data as shown in FIG. 26 (SP80).

The snapshot program 53 then asks the migration program 51 to migrate those files FL for which the snapshot acquisition flag is set to "ON" in the Mode management table 91 to the archive apparatus 5 (more accurately, the second RAID subsystem 6B) (SP81). As a result, under the control of the migration program 51, these files FL are migrated to the second RAID subsystem 6B from the first RAID subsystem 6A (SP82).

In addition, if the stub file SF of the file FL exists in the primary volume PVOL, the snapshot program 53 records the address for the file FL in the stub file SF in the snapshot SS as the link destination of the file FL in the stub file SF and the address for the corresponding file FL in the second RAID subsystem 6B (SP83) and subsequently deletes the file FL from the primary volume PVOL.

Figure 27:
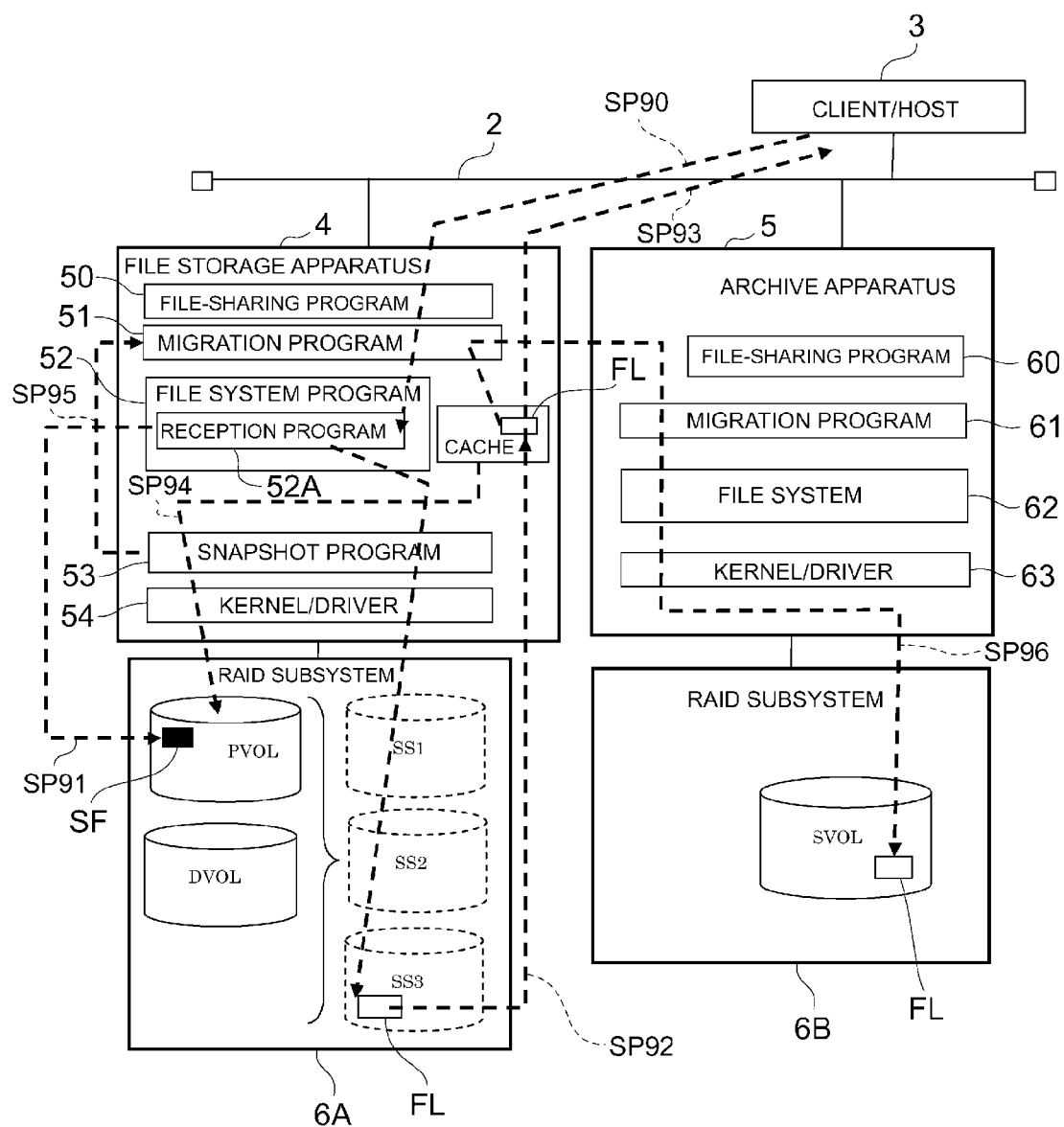
[FIG. 27] A conceptual view illustrating data management processing according to the embodiment in a case where the recall target is a normal file.

Meanwhile, as shown in FIG. 27, if an access request is received from the client/host 3 (SP90), the reception program 52A then accesses the storage area designated as the access destination in the access request and determines whether or not recall processing is required on the basis of information stored in the storage area (SP91). The specific determination method used in step SP91 is the same as the method described earlier for step SP41 of FIG. 18.

Furthermore, if, for example, a stub file SF is stored in the storage area designated as the access destination in the access request and a snapshot SS is registered as the link destination of the file FL in the stub file SF, the reception program 52A generates (regenerates) the file FL by reading the corresponding data stored in the primary volume PVOL and the differential volume DVOL respectively, reads the generated file FL to the cache memory 21B in the file storage apparatus 4 (SP92), and transfers the file FL to the client/host 3 which is the access request source (SP93). The file FL is subsequently referenced/updated using the data in the cache memory 21B.

Meanwhile, when a predetermined snapshot acquisition time is reached, the snapshot program 53 writes back all the files FL stored in the cache memory 21B to the primary volume PVOL (SP94).

In order to secure conformity between data stored in the primary volume PVOL and data stored in the secondary volume SVOL, the snapshot program 53 asks the migration program 51 to migrate the files FL written back to the primary volume PVOL from the cache memory 21B to the second RAID subsystem 6B (SP95). The migration program 51 which received the request then migrates the designated files FL to the second RAID subsystem 6B via the archive apparatus 5 and overwrites the corresponding files in the secondary volume SVOL with these files FL (SP96).

Thereafter, the snapshot program 53 acquires a snapshot SS of the primary volume PVOL or the corresponding file system data, and changes the link destination of the file FL in the stub file SF corresponding to the file FL to the snapshot SS.

(1-3-2) Various Types of Processing Relating to the Data Management Method of this Embodiment The specific processing content of the various types of processing relating to the data management method of this embodiment will be described next with reference to FIGS. 28 to 36. Note that, in the following description, the subject of the various types of processing will be the "program" but in reality it is understood that the processing is executed, based on this program, by the CPU 20 (FIG. 1) of the file storage apparatus 4 or the CPU 30 (FIG. 1) of the archive apparatus 5.

(1-3-2-1) Access Request Reception Processing

Figure 28:
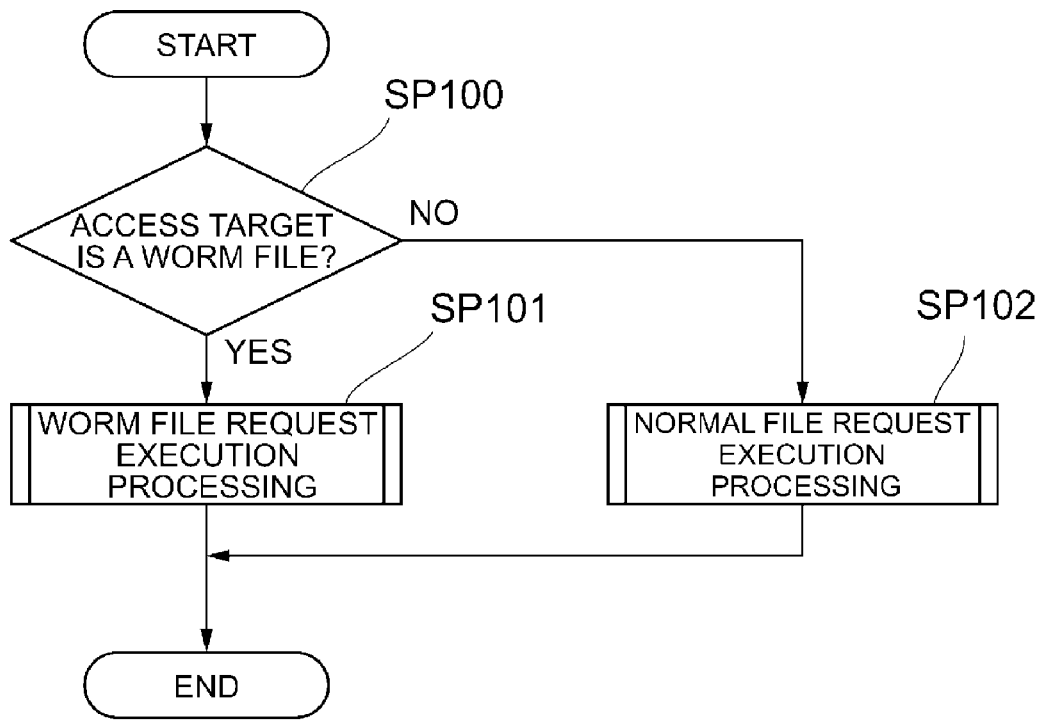
[FIG. 28] A flowchart showing a processing routine of the access request reception processing.

FIG. 28 shows a processing routine for access request reception processing that is executed by the reception program 52A which receives the access request from the file-sharing program 50 in the file storage apparatus 4.

In the file storage apparatus 4, when an access request (read request, write request, file open request, or file close request) designating a file FL is received from the client/host 3, this access request is supplied to the reception program 52A via the file-sharing program 50. When the access request is received, the reception program 52A then executes processing corresponding to the access request in accordance with the processing routine shown in FIG. 28.

Specifically, when the access request is supplied from the file-sharing program 50, the reception program 52A starts the access request reception processing shown in FIG. 28, and first refers to the Mode management table 91 (FIG. 17) to determine whether or not the file designated in the access request is a WORM file (SP100).

When an affirmative result is obtained in this determination, the reception program 52A executes WORM file request execution processing, which is processing corresponding to an access request for a WORM file (SP101), and then terminates the access request reception processing. When a negative result is obtained in the determination of step SP100, the reception program 52A executes normal file request reception processing, which is processing corresponding to an access request for a normal file (SP102) and then terminates the access request reception processing.

(1-3-2-2) WORM File Request Execution Processing

Figure 29:
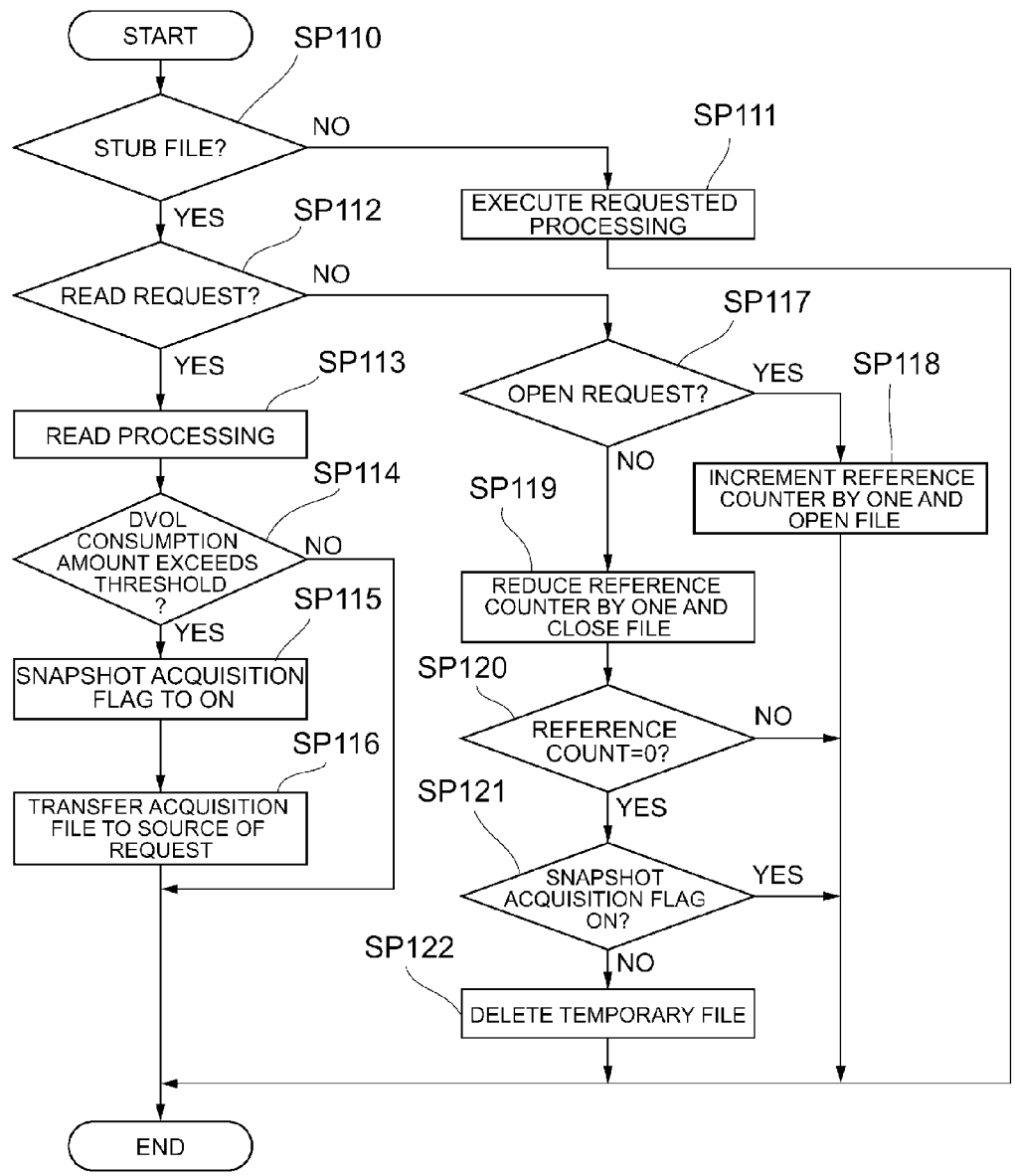
[FIG. 29] A flowchart showing a processing routine of WORM file request execution processing.

FIG. 29 shows a specific processing routine for WORM file request execution processing that is executed by the reception program 52A in step SP101 of the access request reception processing described earlier.

Upon advancing to step SP101 of the access request reception processing, the reception program 52A starts the WORM file request execution processing and first refers to the Mode management table 91 to determine whether or not a stub file is stored in the storage area designated as the access destination in the access request (SP110).

Obtaining a negative result in this determination means that the subject file is saved in the address position designated in the access request (in other words, this is a state where a snapshot of the file has not been acquired and migration to the second RAID subsystem 6B has not occurred). At this time, the reception program 52A executes processing corresponding to the request designated in the access request for the subject file (read request, file open request, or file close request) (SP111), and then terminates the WORM file request execution processing.

However, obtaining an affirmative result in the determination of step SP110 signifies that the subject file has already been deleted from the address position designated in the access request and that a stub file for the file is stored at the address position (in other words, a snapshot of the file has been acquired or migration to the second RAID subsystem 6B has taken place). At this time, the reception program 52A determines whether or not the access request is a read request in order to execute processing corresponding to the access request (SP112).

When an affirmative result is obtained in this determination, the reception program 52A reads the file designated in the access request from the link destination (SP113).

Specifically, the reception program 52A specifies a link destination of the file by referring to the Mode management table 91. If the link destination is a snapshot, the reception program 52A acquires the file from the corresponding snapshot.

Furthermore, if the link destination is the archive apparatus 5, the reception program 52A asks the migration program 51 (FIG. 2) to acquire this file from the second RAID subsystem 6B and stores the file thus obtained in the primary volume PVOL as a temporary file. Furthermore, the reception program 52A changes the snapshot acquisition flag of the file in the Mode management table 91 to "OFF" and adds the storage location of the file in the primary volume PVOL to the corresponding entry in the Mode management table 91 as the link destination of the temporary file. In addition, the reception program 52A registers the consumption size of the differential volume DVOL, as a result of storing the file as a temporary file in the primary volume PVOL, the entry of the file in the Mode management table 91.

In addition, if the link destination is a temporary file (specifically, the file is already stored as a temporary file in the primary volume PVOL), the reception program 52A acquires the temporary file from the primary volume PVOL.

The reception program 52A subsequently extracts log information relating to the file from logs registered in the log file 90 (FIG. 16) and calculates the total value of the consumption amounts of the files in the differential volume DVOL. The reception program 52A then determines whether the total value exceeds a predetermined threshold (SP114).

When a negative result is obtained in this determination, the reception program 52A advances to step SP116; however, when an affirmative result is obtained, the reception program 52A sets the snapshot acquisition flag of the file in the Mode management table 91 to "ON" (SP115).

The reception program 52A then transfers the file acquired in step SP113 to the client/host 3 which is the access request source (SP116) and then terminates the WORM file request execution processing.

Meanwhile, when a negative result is obtained in the determination of step SP112, the reception program 52A determines whether or not the access request received at this time is a file open request (SP117).

When an affirmative result is obtained in this determination, the reception program 52A increments the predetermined reference counter (adds "1"), opens the file (SP118), and then terminates the WORM file request execution processing. However, when a negative result is obtained in the determination of step SP117, the reception program 52A reduces the reference counter (reduces the count by "1") and closes the file (SP119).

The reception program 52A determines whether or not the count value of the reference counter is "0" (SP120). When a negative result is obtained in this determination, this means that a user referring to the file already exists. The reception program 52A thus terminates the WORM file request execution processing.

However, when a negative result is obtained in the determination of step SP120, this means that the last user referring to the file has closed the file. At this time, the reception program 52A refers to the Mode management table 91 to determine whether or not the snapshot acquisition flag of the file has been set to "ON" (SP121).

When an affirmative result is obtained in this determination, the reception program 52A terminates the WORM file request execution processing. However, when a negative result is obtained in the determination of step SP121, the reception program 52A deletes the temporary file for this file from the primary volume PVOL (SP122) and then terminates the WORM file request execution processing.

(1-3-2-3) Normal File Request Execution Processing

Figure 30:
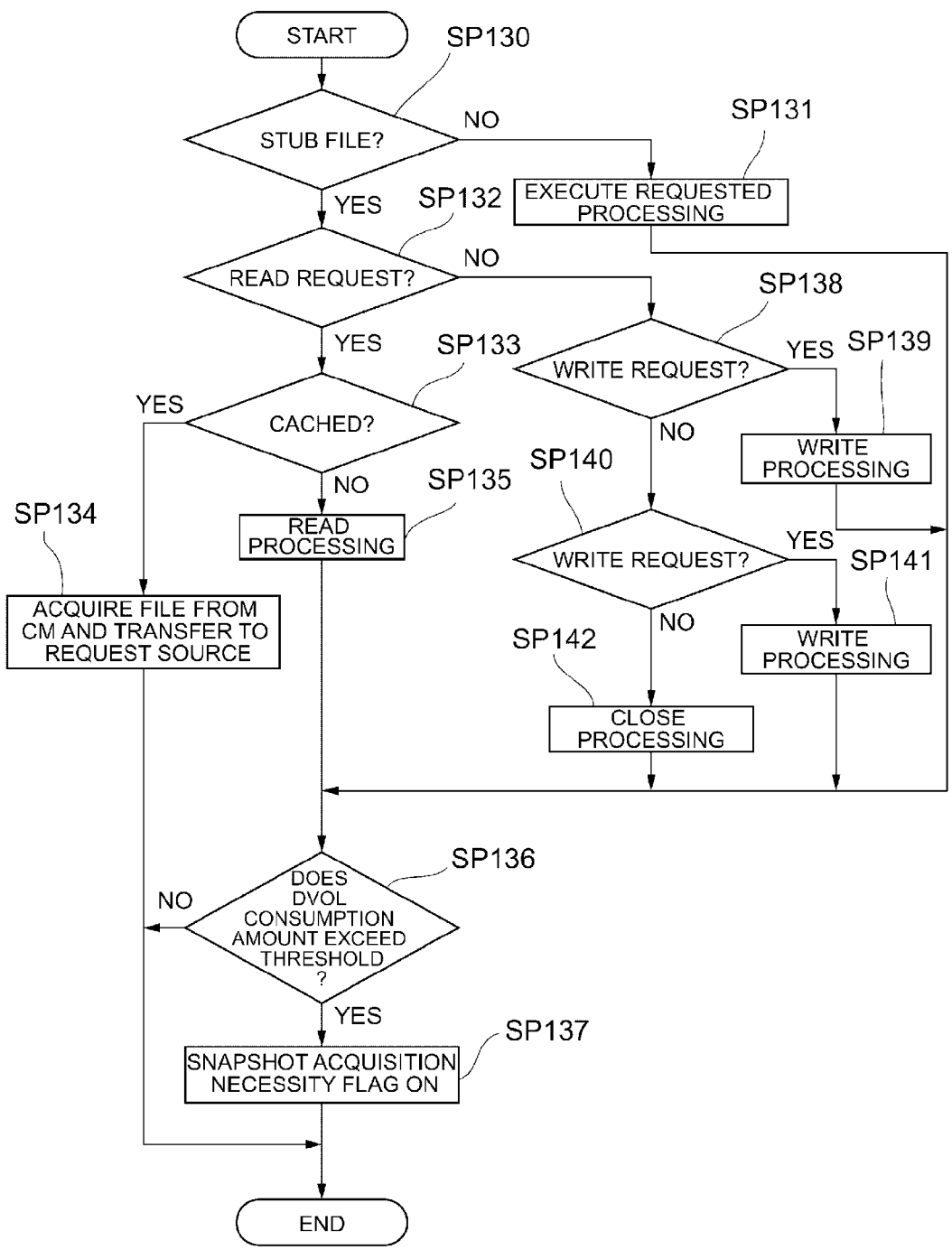
[FIG. 30] A flowchart showing a processing routine of normal file request execution processing.

FIG. 30 shows a specific processing routine for normal file request execution processing that is executed by the reception program 52A in step SP102 of the access request reception processing mentioned earlier.

The reception program 52A, upon advancing to the access request reception processing step SP102, starts normal file request execution processing, and first refers to the Mode management table 91 to determine whether or not a stub file is stored in the storage area designated as the access destination in the access request (SP130).

When a negative result is obtained in this determination, this means that a subject file is saved in the address position designated in the access request (specifically, a state where a snapshot of the file has not been acquired and migration to the second RAID subsystem 6B has not occurred). At this time, the reception program 52A executes processing that corresponds to a request (read request, file open request, or file close request) that is designated in the access request to the subject file (SP131), and then terminates the normal file request execution processing.

However, obtaining an affirmative result in the determination of this step SP130 means that the subject file has already been deleted from the address position designated in the access request and a stub file for the file is stored in the address position (specifically, a snapshot of the file has been acquired and migration to the second RAID subsystem 6B has taken place). At this time, the reception program 52A determines whether or not the access request is a read request in order to execute processing corresponding to the access request (SP132).

When an affirmative result is obtained in this determination, the reception program 52A determines whether or not the file designated in the access request is in the cache memory 21B (FIG. 1) (SP133).

When an affirmative result is obtained in this determination, the reception program 52A reads the file designated in the access request from the cache memory 21B and, after transferring the read file to the access request source (SP134), terminates the normal file request execution processing.

However, when an affirmative result is obtained in the determination of step SP133, the reception program 52A reads the file designated in the access request from the link destination (SP135).

Specifically, the reception program 52A refers to the inode management table 91 and specifies the link destination of the file. If the link destination is a snapshot, the reception program 52A acquires the file from the corresponding snapshot, and transfers the acquired file to the access request source.

Furthermore, if the link destination is the archive apparatus 5, the reception program 52A asks the migration program 51 to acquire the file from the second RAID subsystem 6B and, after storing the file thus obtained in the cache memory 21B as a temporary file, transfers the file to the access request source. In addition, the reception program 52A changes the snapshot acquisition flag of the file in the inode management table 91 to "OFF", and adds the storage location of the file in the cache memory 21B to the corresponding entry in the inode management table 91 as a temporary file link destination. The reception program 52A also registers the consumption size of the differential volume DVOL, as a result of storing the file in the primary volume PVOL as a temporary file, in the entry of the file in the inode management table 91.

Furthermore, if the link destination is a temporary file (specifically, the file has already been stored in the cache memory 21B as a temporary file), the reception program 52A acquires the temporary file from the cache memory 21B.

The reception program 52A then extracts log information relating to the file from logs registered in the log file 90 (FIG. 16) and calculates the total value of the consumption amounts of the files in the differential volume DVOL. The reception program 52A then determines whether the total value exceeds a predetermined threshold (SP136).

When a negative result is obtained in this determination, the reception program 52A terminates the normal file request execution processing. When an affirmative result is obtained in the determination of step SP136, the reception program 52A sets the snapshot acquisition flag for the file in the inode management table 91 to "ON" (SP137), and then terminates the normal file request execution processing.

However, when a negative result is obtained in the determination of step SP132, the reception program 52A determines whether the access request received at this time is a write request (SP138).

When an affirmative result is obtained in this determination, the reception program 52A updates the file stored in the cache memory 21B or the temporary file of the file stored in the primary volume PVOL in response to an access request. The reception program 52A also registers the consumption size of the differential volume DVOL as a result of storing the file in the primary volume PVOL as a temporary file, in an entry of the file in the Mode management table 91 (SP139) and then proceeds to step SP136.

However, when a negative result is obtained in the determination of step SP138, the reception program 52A determines whether or not the access request received at this time is a file open request for supplying the file open request (SP140).

Further, when an affirmative result is obtained in this determination, the reception program 52A executes open processing to open the file designated in the access request among the files or temporary files stored in the cache memory 21B (SP141), and then proceeds to step SP126.

However, when a negative result is obtained in the determination of step SP140, the reception program 52A executes close processing to close the file designated in the access request among the files or temporary files stored in the cache memory 21B (SP142), and then proceeds to step SP136.

(1-3-2-4) Migration Processing

Figure 31:
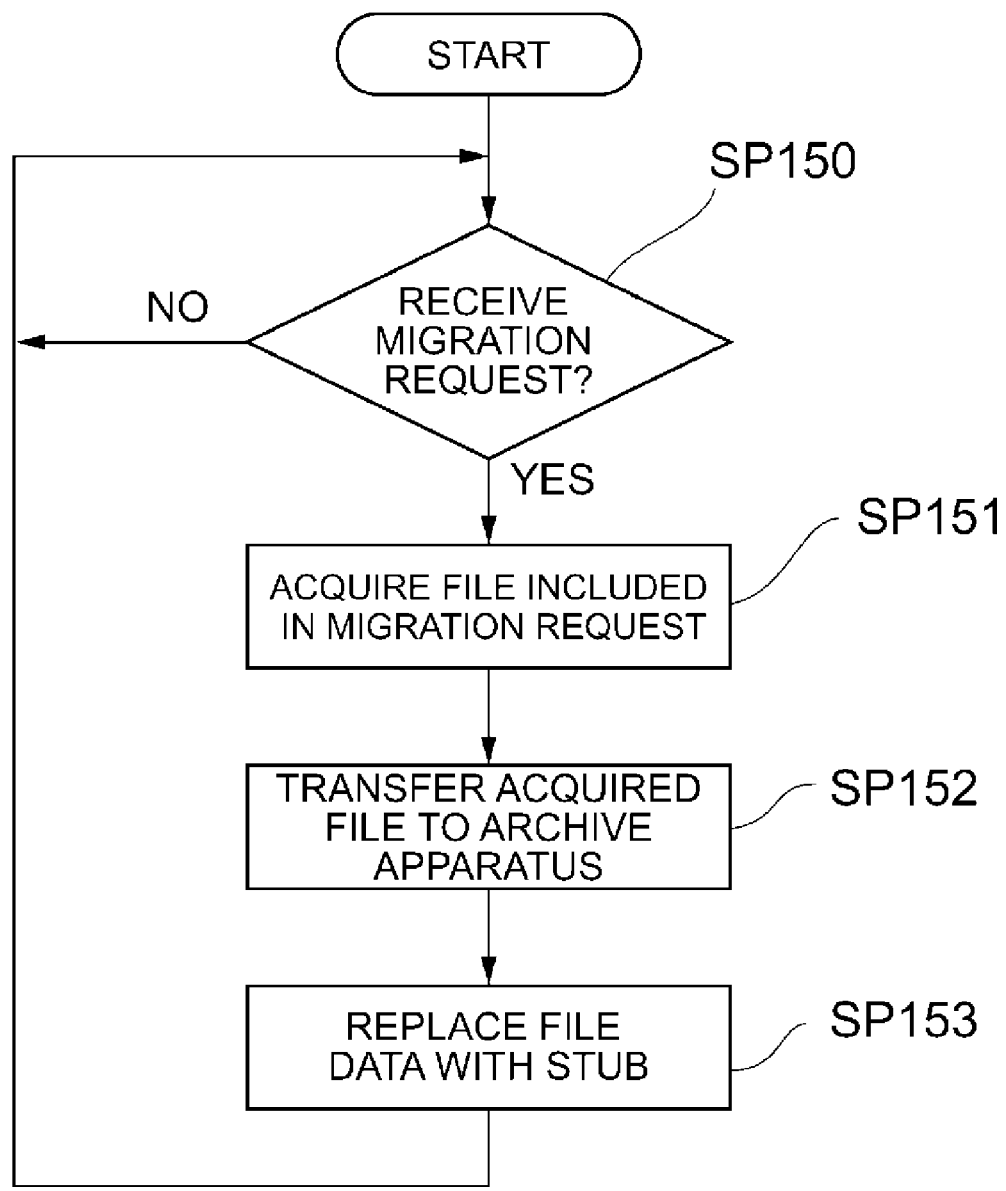
[FIG. 31] A flowchart showing a processing routine of file storage migration processing.

FIG. 31 shows a specific processing routine for file storage migration processing that is executed by the migration program 51 of the file storage apparatus 4.

The migration program 51 of the file storage apparatus 4 starts file storage migration processing when the power source of the file storage apparatus 4 is switched on, and first waits to receive a migration request from the client/host 3 (SP150).

When before long this migration request is received, the migration program 51 refers to the Mode management table 91 and reads the file designated in the migration request from the primary volume PVOL (SP151).

The migration program 51 transfers the file read from the primary volume PVOL to the second RAID subsystem 6B sequentially via the network 2 and the archive apparatus 5 (SP152), generates a stub file registered by the archive apparatus 5 as the link destination for the file, and stores the generated stub file in the address position where the file is stored in the primary volume PVOL in place of this file (SP153).

The migration program 51 then returns to step SP150, and repeats the processing of steps SP150 to SP153.

Figure 32:
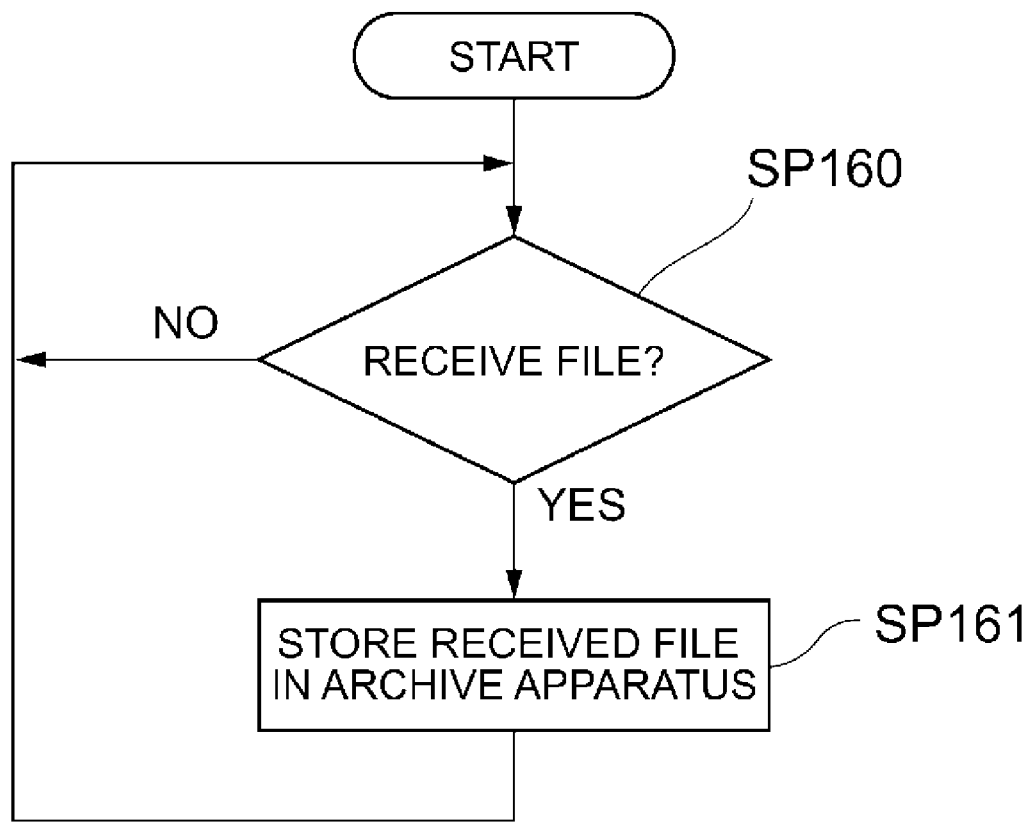
[FIG. 32] A flowchart showing a processing routine of archive migration processing.

Meanwhile, FIG. 32 shows a specific processing routine for archive migration processing that is executed by the migration program 51 of the archive apparatus 5.

The migration program 51 of the archive apparatus 5 starts archive migration processing when the power source of the archive apparatus 5 is switched on, and first waits for the data of the migration target file to be transferred from the file storage apparatus 4 (SP160).

When before long this migration request is received, the migration program 51 then stores the file data in the second RAID subsystem 6B (SP161) and the migration program 51 returns to step SP160 and then repeats the processing of steps SP160 and SP161.

Figure 33:
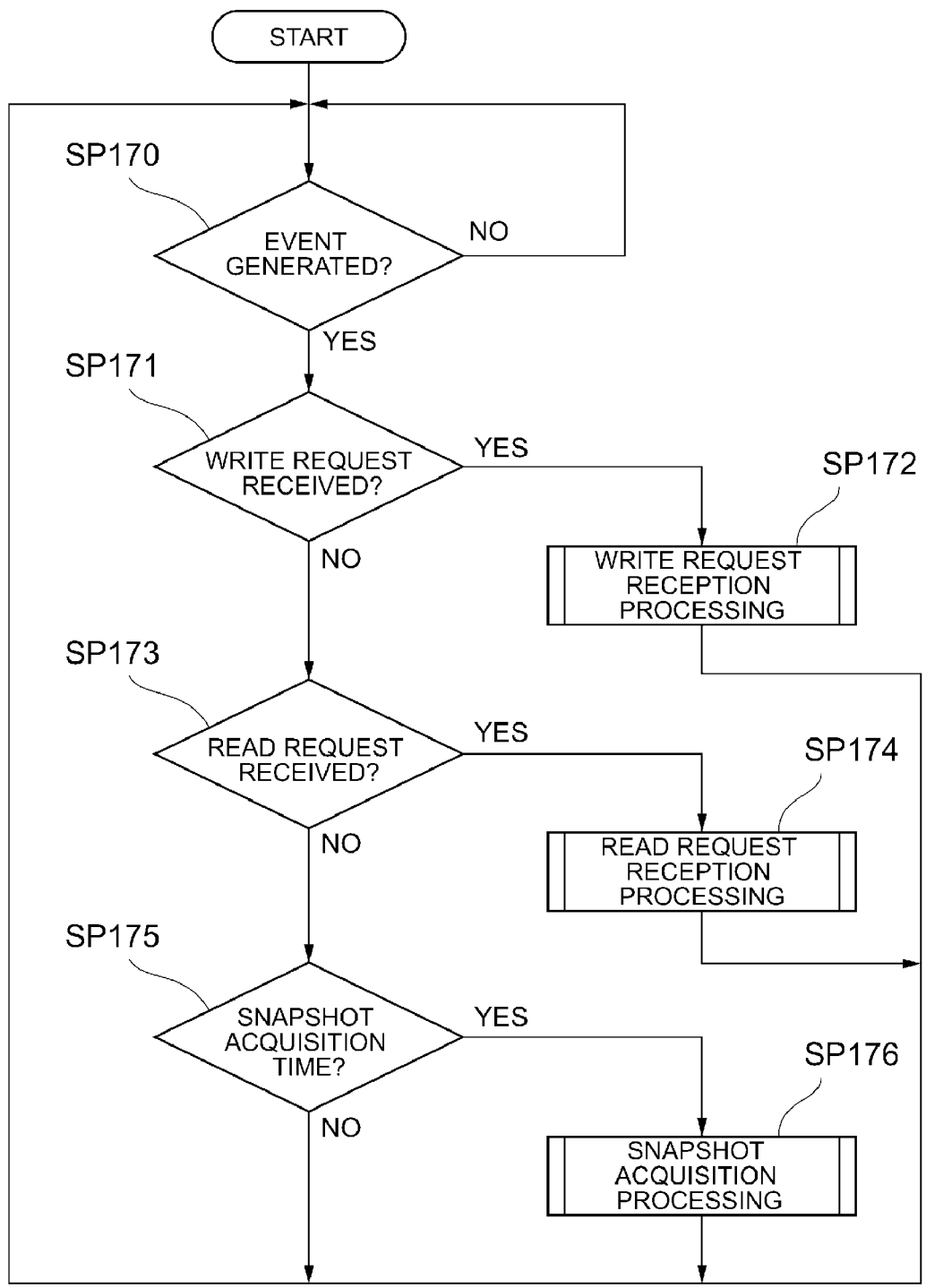
[FIG. 33] A flowchart showing a processing routine of snapshot association processing.

(1-3-2-5) Snapshot Program Processing
(1-3-2-5-1) Snapshot Association Processing Meanwhile, FIG. 33 shows a specific processing routine for snapshot association processing that is executed by the snapshot program 53.

The snapshot program 53 starts the snapshot association processing shown in FIG. 33 when the power source of the file storage apparatus 4 is switched on, and first stands by for some kind of event to be generated (in which a write request is received from the client/host 3, a read request for reading data from a snapshot is received, or a pre-determined snapshot acquisition time is reached, and so forth) (SP170).

When before long an affirmative result is obtained in step SP170, the snapshot program 53 determines whether or not the event generated at that time is the act of receiving a write request from the client/host 3 (SP171).

If an affirmative result is obtained in this determination, when data is written to the primary volume PVOL in response to the write request, the snapshot program 53 saves the data stored in the primary volume PVOL to the differential volume DVOL immediately before the data is written (SP172), and then returns to step SP170.

However, when a negative result is obtained in the determination of step SP171, the snapshot program 53 determines whether or not the event that is generated at that time is the act of receiving a read request to read data from the snapshot (SP173).

When an affirmative result is obtained in this determination, the snapshot program 53 generates data for the files contained in the designated snapshot on the basis of the data of the corresponding files stored in the primary volume PVOL and the pre-update data (differential data) of the files stored in the differential volume DVOL, and transfers the generated data to the request source (SP174). The snapshot program 53 then returns to step SP170.

However, when a negative result is obtained in the determination of step SP173, the snapshot program 53 determines whether or not the event generated at the time is the act of reaching the snapshot acquisition time (hereinafter referred to as the snapshot acquisition time) determined by the system administrator or the like beforehand, or the act of receiving an irregular snapshot acquisition command from the system administrator (SP175).

The snapshot program 53 returns to step SP170 when a negative result is obtained in this determination. However, when an affirmative result is obtained in the determination of step SP175, the snapshot program 53 acquires a snapshot of the corresponding primary volume PVOL and/or the file system data in accordance with a preset schedule (SP176), and then returns to step SP170.

(1-3-2-5-2) Write Request Reception Processing

Figure 34:
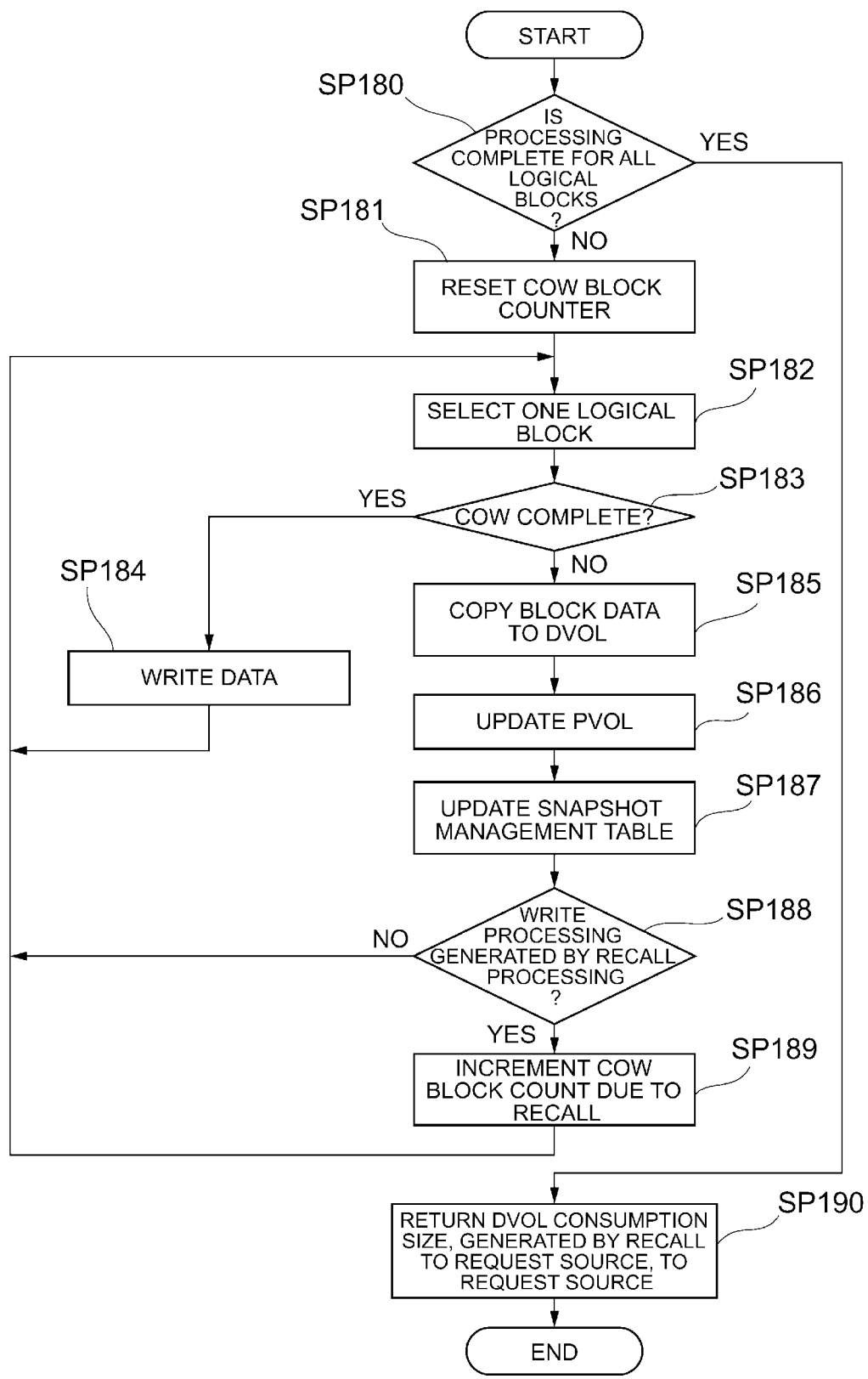
[FIG. 34] A flowchart showing a processing routine of write request reception processing.

FIG. 34 shows a specific processing routine for write request reception processing that is executed by the snapshot program 53 in step SP172 of the snapshot association processing (FIG. 33).

Upon advancing to the snapshot association processing step SP172, the snapshot program 53 starts write request reception processing shown in FIG. 34, and determines whether or not writing of all the data to the primary volume PVOL corresponding to the write request supplied from the client/host 3 is complete (SP180).

When a negative result is obtained in this determination, the snapshot program 53 resets the counter (hereinafter referred to as the "COW counter") for counting the number of logical blocks in which data saving is generated due to recall processing as described subsequently (SP181).

The snapshot program 53 then selects one logical block from among the logical blocks in the primary volume PVOL to which data is to be written in response to this write request (SP182). The snapshot program 53 determines whether, for the logical block selected in step SP182, the data directly before the new data is stored has already been saved in the differential volume DVOL (SP183).

When an affirmative result is obtained in this determination, the snapshot program 53 writes new data to the logical block by controlling the disk controller 44 (FIG. 1) (SP184), and then returns to step SP182.

However, when a negative result is obtained in the determination of step SP183, by controlling the disk controller 44, the snapshot program 53 saves (copies) the data of the logical block to the differential volume DVOL (SP185) and then writes new data to the logical block (SP186).

The snapshot program 53 then updates the snapshot management table 80 (FIG. 7) on the basis of the processing of these steps SP185 and SP186 (SP187) and subsequently determines whether or not the writing of data to the primary volume PVOL at this time is due to write processing generated by the recall processing (SP188).

When a negative result is obtained in this determination, the snapshot program 53 returns to step SP182. However, when an affirmative result is obtained in the determination of step SP188, the snapshot program 53 increments (adds "1" to) the count value of the COW block counter (SP189).

The snapshot program 53 then returns to step SP182 and subsequently repeats the same processing until an affirmative result is obtained in step SP180.

When before long an affirmative result is obtained in step SP180 as a result of completing the writing of all the data designated in the received write request to the primary volume PVOL, the snapshot program 53 computes the consumption size of the differential volume DVOL generated in the recall processing on that occasion (SP190).

Specifically, the snapshot program 53 computes the consumption size by multiplying the count value of the COW block counter by the block size of the logical block. The snapshot program 53 then sends the consumption size of the differential volume DVOL calculated in this manner to the write request source and terminates the write request reception processing.

(1-3-2-5-3) Read Request Reception Processing

Figure 35:
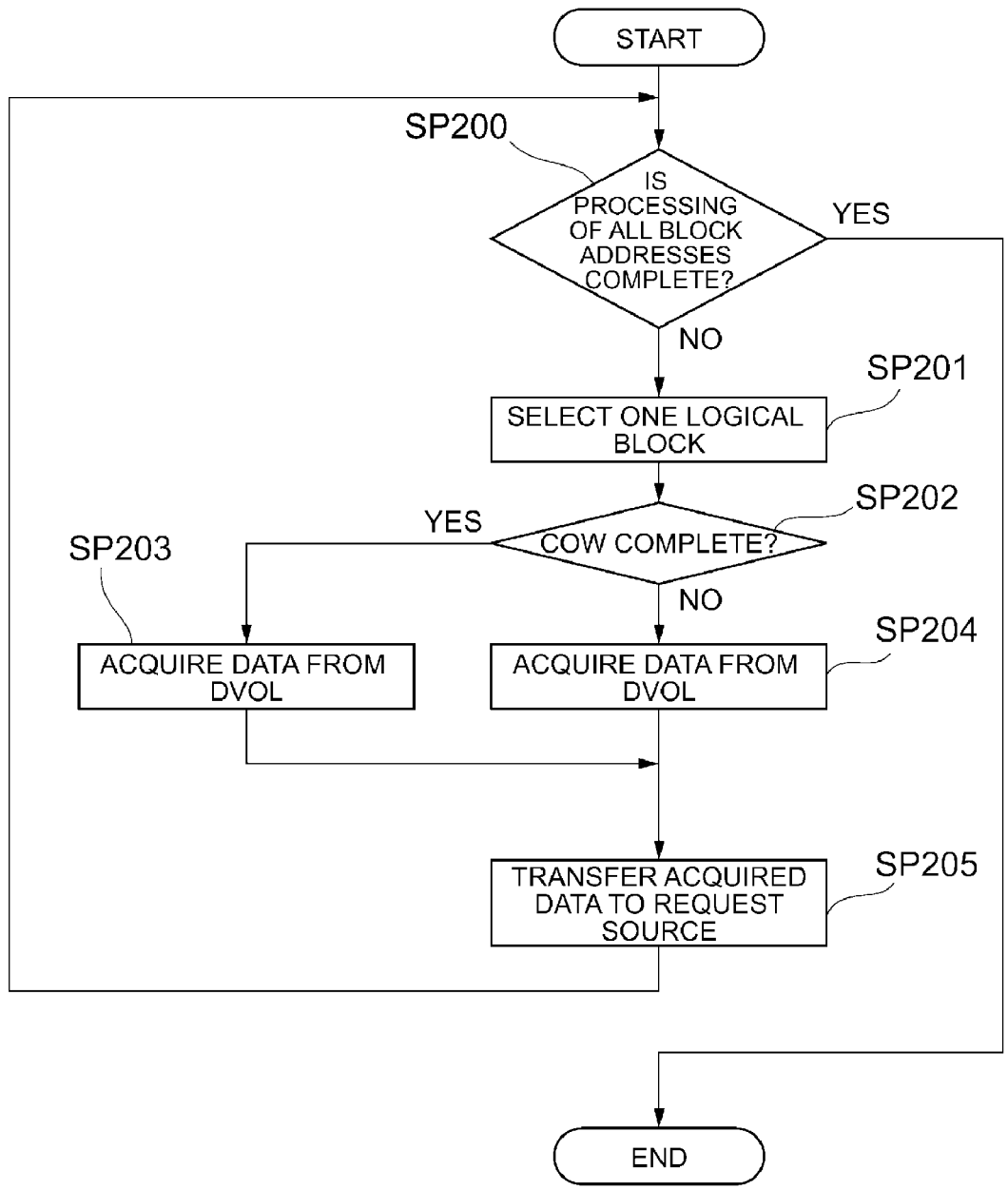
[FIG. 35] A flowchart showing a processing routine of read request reception processing.

FIG. 35 shows a specific processing routine for read request reception processing that is executed by the snapshot program 53 in step SP174 of the snapshot association processing (FIG. 33).

Upon advancing to step SP174 of the snapshot association processing, the snapshot program 53 starts the read request reception processing shown in FIG. 35, and selects a single logical block from all the logical blocks from which the data designated in the read request supplied from the client/host 3 is to be read (SP201).

The snapshot program 53 then determines, on the basis of the snapshot management table 80, whether or not saving of data to the differential volume DVOL is generated due to the copy-on-write performed on the logical block selected in step S201 (SP202).

When an affirmative result is obtained in this determination, the snapshot program 53 reads the logical block data saved to the differential volume DVOL due to the copy-on-write from the differential volume DVOL (SP203). When a negative result is obtained in the determination of step SP202, the snapshot program 53 then reads this logical block data from the primary volume PVOL (SP204).

The snapshot program 53 then transfers the data acquired in step SP203 or step SP204 to the source of this read request (SP205), and then returns to step SP200. The snapshot program 53 then repeats the processing of steps SP200 to SP205 until an affirmative result is obtained in step SP200.

Furthermore, if an affirmative result is obtained in step SP200 when before long reading of the data from all the logical blocks storing the data designated in the read request is complete, the snapshot program 53 terminates the read request reception processing.

(1-3-2-5-4) Snapshot Acquisition Processing

Figure 36:
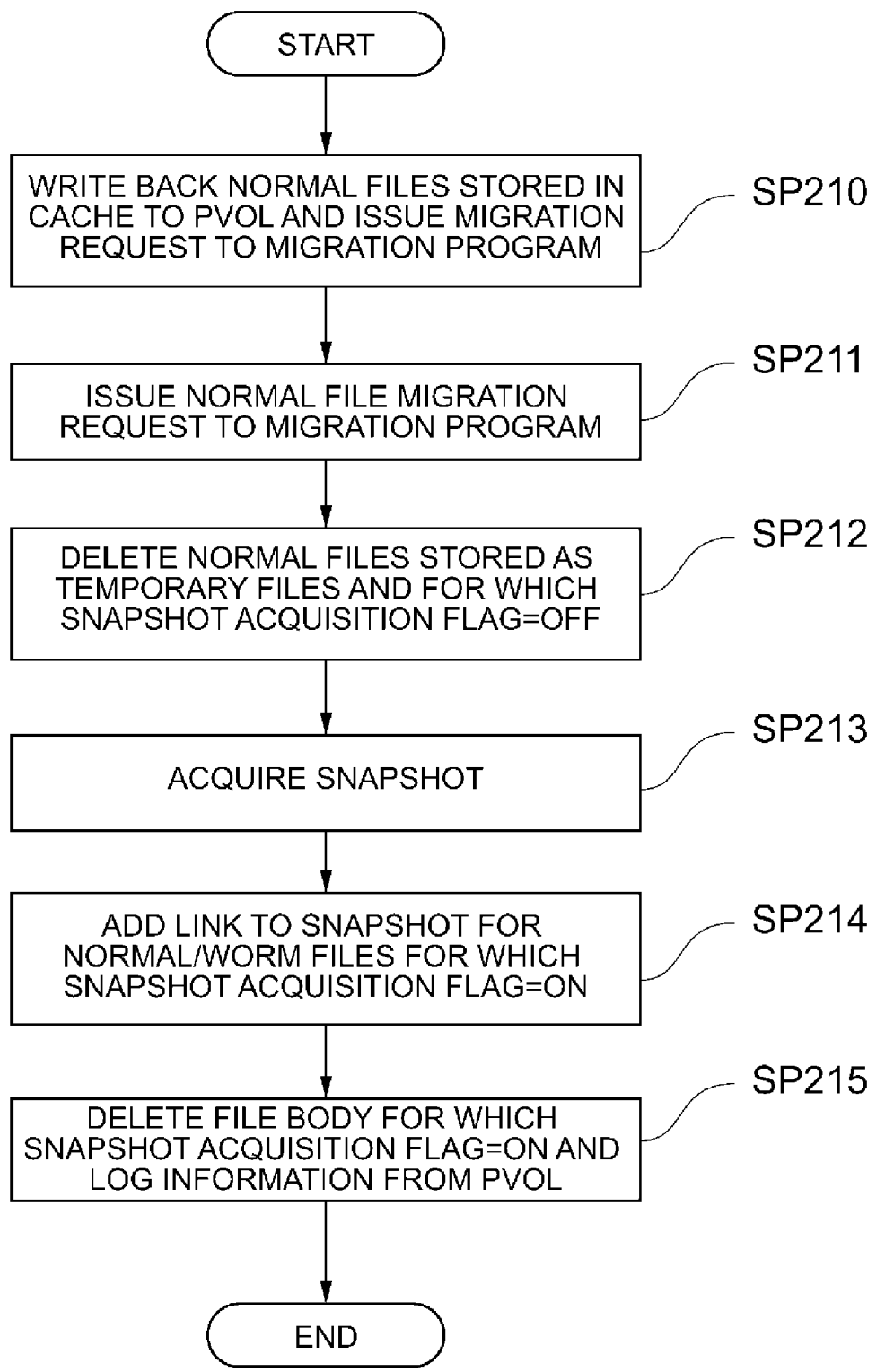
[FIG. 36] A flowchart showing a processing routine of snapshot acquisition processing.

FIG. 36 shows a specific processing routine for snapshot acquisition processing that is executed by the snapshot program 53 in step SP176 of the snapshot association processing (FIG. 33).

Upon advancing to step SP176 of the snapshot association processing, the snapshot program 53 starts the snapshot acquisition processing shown in FIG. 36, writes back normal files stored in the cache memory 21B to the primary volume PVOL, and sends a normal file migration request to the migration program 51 (FIG. 2) (SP210).

The snapshot program 53 then sends a migration request to migrate normal files stored as temporary files in the primary volume PVOL to the migration program 51 (SP211). The snapshot program 53 also sets the snapshot acquisition flag to "OFF" and deletes the normal files stored as temporary files in the primary volume PVOL from the primary volume PVOL (SP212).

Thereafter, the snapshot program 53 acquires a snapshot by updating the snapshot management table 80 (SP213). As a result, if the content of the primary volume PVOL is subsequently updated, the pre-update data is saved to the differential volume DVOL and the snapshot management table 80 is accordingly updated sequentially.

The snapshot program 53 then adds a link pointing to the corresponding files contained in the snapshot acquired at the time as a link for the file in the Mode management table 91 for those files (WORM files and/or normal files), among the files stored in the primary volume PVOL, for which the snapshot acquisition flag is set to "ON" in the Mode management table 91 (SP214).

The snapshot program 53 then deletes the body of the files for which the snapshot acquisition flag is set to "ON" in the Mode management table 91 from the primary volume PVOL, deletes the logs for these files from the log file 90 (SP215), and then terminates the snapshot acquisition processing.

(1-4) Advantageous Effects of Embodiment

As described hereinabove, with the computing system 1 of this embodiment, in the file storage apparatus 4, the consumption amount of the differential volume DVOL generated by the recall is monitored, files wastefully consuming the differential volume DVOL are specified, and a snapshot of these files is acquired and, when there is a read request to read these files from the client/host 3, the files are generated on the basis of the data stored in the primary volume PVOL and the differential volume DVOL, and the generated files are transferred to the client/host 3 which is the source of the read request. Hence, for files for which a snapshot has been acquired, recall processing is prevented from occurring even when the files have been deleted from the primary volume PVOL. Accordingly, a drop in the response performance of the file storage apparatus 4 can be effectively prevented while the usage efficiency of the primary volume PVOL is improved by preventing depletion of the capacity of the primary volume PVOL due to recall processing.

Moreover, according to the present invention, if scheduling to acquire a snapshot at regular intervals is also adopted, deletion of files specified as files that are wastefully consuming the differential volume DVOL is prohibited until the next scheduled snapshot acquisition time, and a snapshot including these files is acquired at the relevant scheduled acquisition time. It is thus possible to prevent the wasteful consumption of the differential volume DVOL as caused by frequent recalls and to prevent recalls from adversely affecting regular snapshot acquisition. The usage efficiency of the primary volume PVOL can be improved still further without lowering the response performance of the file storage apparatus 4.

(2) Second Embodiment

Figure 37:
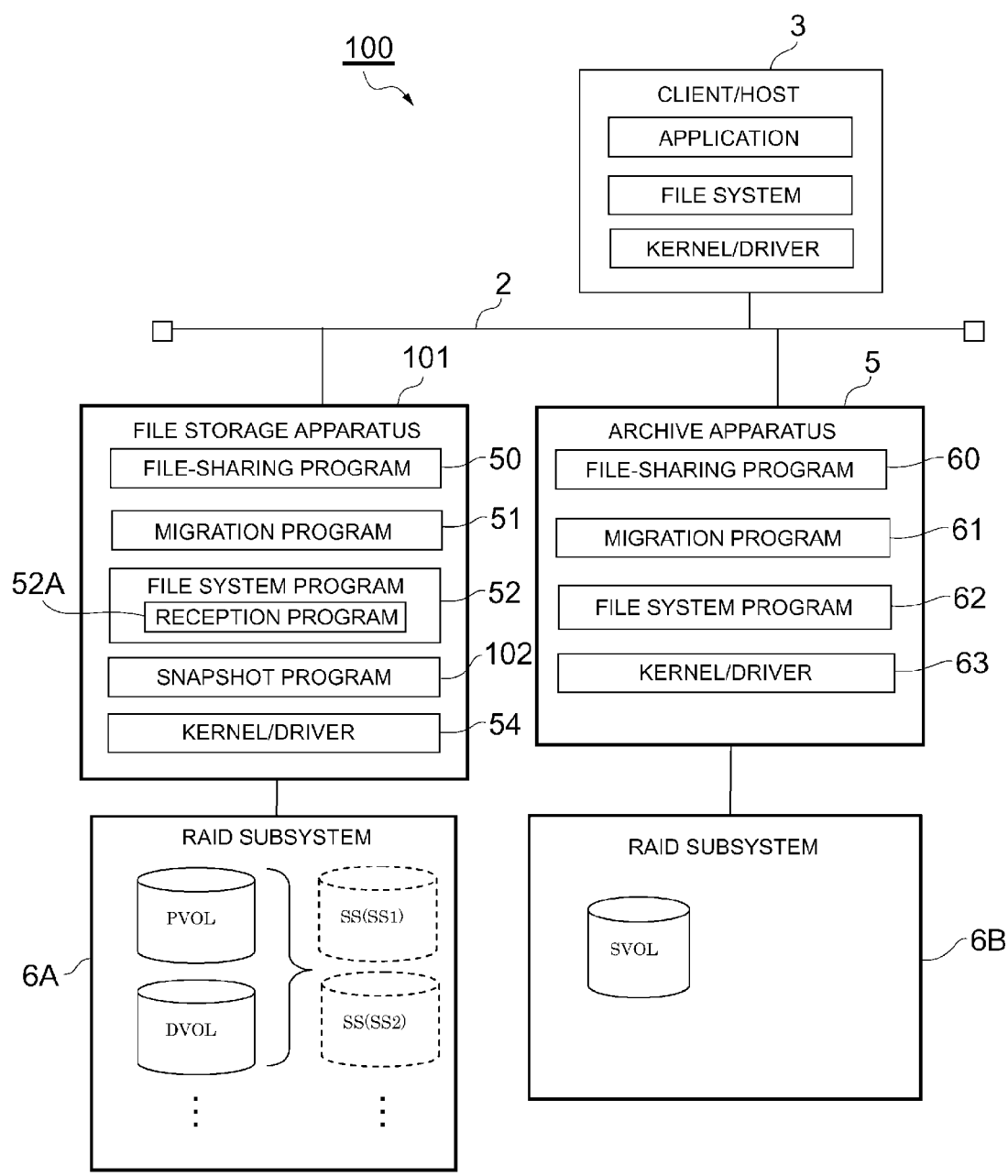
[FIG. 37] A block diagram showing a software configuration of a computing system according to a second embodiment.

FIG. 37, in which the same reference numerals are assigned to parts corresponding to parts in FIG. 2, shows the software configuration of a computing system 100 according to a second embodiment. This computing system 100 is configured in the same way as the computing system 1 according to the first embodiment except for the difference in the functions of a migration program 102 of a file storage apparatus 101. The functions of the migration program 102 of this embodiment will be described hereinbelow.

For example, in the computing system 1 according to the first embodiment, one cause of frequent recall occurrence may be attributed to files with a high usage frequency being migrated to the second RAID subsystem 6B from the first RAID subsystem 6A. This condition may generate errors in the selection of migration target files. Note that, in the following description, a condition where files with a high usage frequency are migrated from the first RAID subsystem 6A to the second RAID subsystem 6B is referred to as "low migration accuracy" and the opposite condition is referred to as "high migration accuracy."

Hence, in the file storage apparatus 4, the client/host 3 that has sent a migration request and the consumption size of the differential volume DVOL, which is produced as a result of files for which migration has been requested by the client/host 3 being recalled, are managed, the client/host 3 with a large differential volume DVOL consumption size is specified and, as long as a snapshot of the files is acquired when a file migration request is received from the client/host 3, wasteful consumption of the differential volume DVOL can be reduced.

Hence, in the case of this embodiment, the migration program 102 of the file storage apparatus 102 associates, each time a migration request is received, the identifier of the client/host 3 which is the migration request source with the path names of the files for which migration is requested by the migration request as shown in FIG. 38, and stores the resulting information in the memory 21A as migration history information 103.

Each time a file is migrated to the second RAID subsystem 6B in response to the migration request, the migration program 102 determines, as shown in FIG. 39, relationships between clients/hosts 3 that have sent migration requests and the differential volume DVOL consumption sizes that are produced as a result of recalling files for which the clients/hosts 3 have requested migration on the basis of the migration history information 103 and the log file 90 described for FIG. 16, and specifies the clients/hosts 3 with low migration accuracy from these relationships.

Specifically, a client/host 3 with low migration accuracy migrates files with a high usage frequency (that is, files recalled frequently and the like), and hence the consumption size of the differential volume DVOL is large as a result of such recalls. The migration program 102 therefore specifies clients/hosts 3 with a high differential volume DVOL consumption size as clients/hosts 3 with low migration accuracy.

If a migration request is subsequently received from such a client/host 3 with a low migration accuracy, the migration program 102 then sets the corresponding snapshot acquisition flag in the Mode management table 91 to "ON" for those files designated as migration targets in the migration request.

As a result, these files are acquired as a snapshot at the time of the next snapshot acquisition and if an access request to access these files is subsequently supplied from the client/host 3, these files are read from the snapshot and transferred to the client/host 3.

Figure 40:
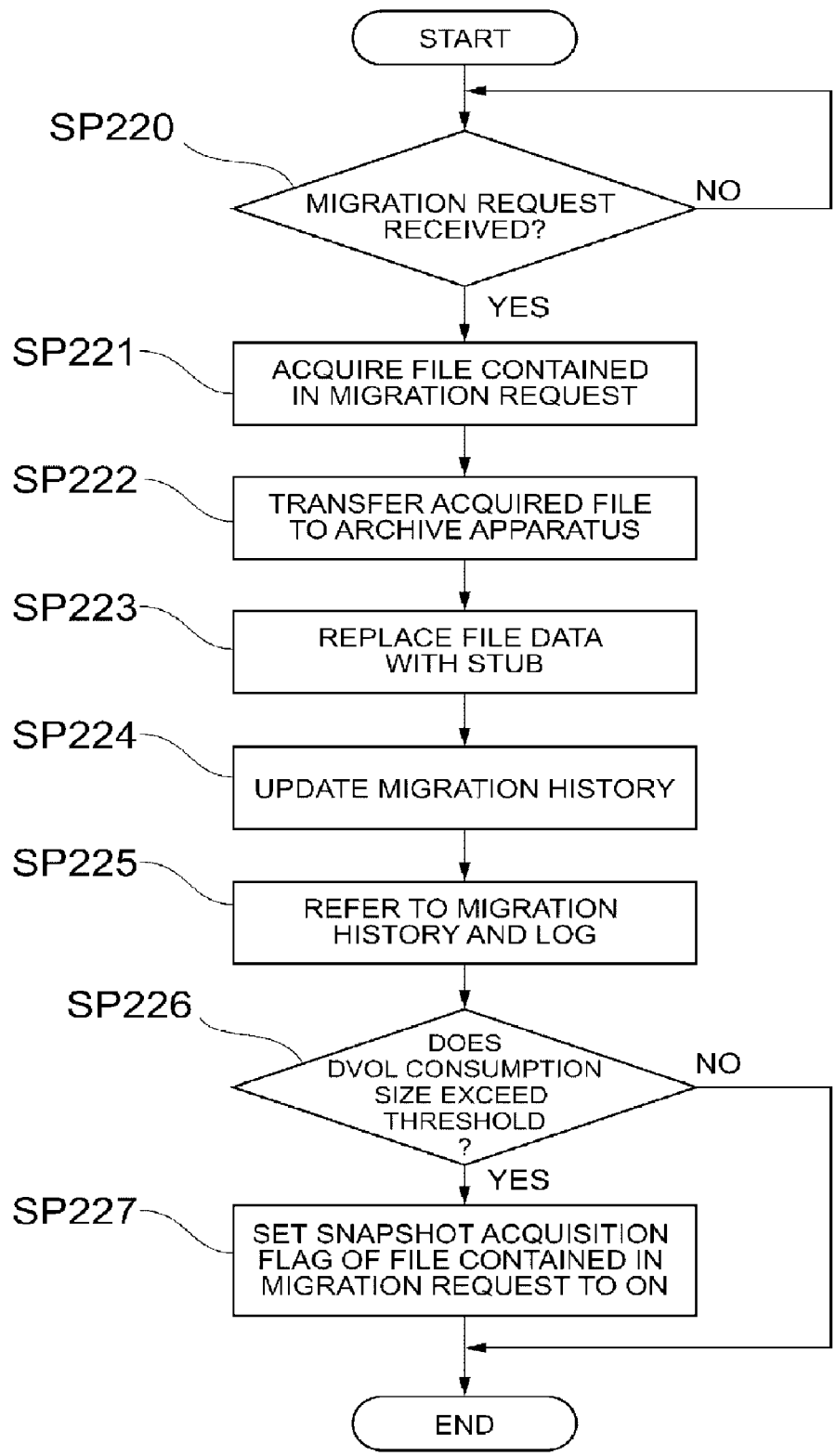
[FIG. 40] A flowchart showing a processing routine of file storage migration processing according to the second embodiment.

FIG. 40 shows a specific processing routine for file storage migration processing that is executed by the migration program 102 of the file storage apparatus 101 according to this embodiment instead of the file storage migration processing described with reference to FIG. 31.

This migration program 102 starts the file storage migration processing when the power source of the file storage apparatus 101 is switched on and first stands by to receive a migration request from the client/host 3 (SP220).

When before long this migration request is received, the migration program 102 processes steps SP220 to SP223 in the same way as steps SP151 to SP153 of the file storage migration processing according to the first embodiment described earlier with reference to FIG. 31.

The migration program 102 then additionally registers required information relating to migration processing that is executed at the time in the migration history information 103 (FIG. 38) (SP224) and subsequently, by comparing the migration history information 103 with the log file 90, determines the correspondence relationship between the migration request source mentioned earlier with reference to FIG. 39 and the consumption size of the differential volume DVOL (SP225).

The migration program 102 then determines, on the basis of the correspondence relationship between the migration request source determined in step SP225 and the consumption size of the differential volume DVOL, whether or not the consumption size of the differential volume DVOL which is the migration request source exceeds a prescribed threshold that is determined beforehand (SP226).

When a negative result is obtained in this determination, the migration program 102 terminates the file storage migration processing. However, when an affirmative result is obtained in the determination of step SP226, the migration program 102 then sets the snapshot acquisition flag of the entry corresponding to the files designated in the migration request as the migration target and in the Mode management table 91 to "ON" (SP226) and then terminates the file storage migration processing.

Thus, a snapshot including these files is next acquired at the time of the next snapshot acquisition.

In the computing system 100 according to this embodiment, if a migration request from the client/host 3 for which the consumption size of the differential volume DVOL exceeds the threshold is received, the corresponding snapshot acquisition flag in the Mode management table 91 is set to "ON" for the files designated in the migration request as the migration target, and these files are therefore acquired as a snapshot at the time of the next snapshot acquisition.

Thus, if an access request for access to the files is subsequently supplied from the client/host 3, the files are read from the snapshot and transferred to the client/host 3, and it is therefore possible to effectively prevent recall processing of these files from occurring. The usage efficiency of the primary volume PVOL can thus be improved without lowering the response performance of the file storage apparatus 4.

(3) Further Embodiments

Note that, in the first and second embodiments described earlier, a case where the present invention is applied to a computing system 1, 100 that is configured as per FIGS. 1 and 2 or FIG. 37 respectively was described but the present invention is not limited to such configurations. For example, the computing system 1 may also be configured such that the first and second RAID subsystems 6A and 6B are omitted, with a plurality of memory apparatuses instead being installed in the file storage apparatus 4 and the archive apparatus 5 so that data from the client/host 3 is saved in the file storage apparatus 4 and data saved in the file storage apparatus 4 is backed up to the archive apparatus 5, with a wide variety of types of configuration being applicable for the configuration of the computing system to which the present invention is applied.

In the first and second embodiments described hereinabove, a case was described where a differential snapshot acquisition system is adopted as the snapshot acquisition system of the first RAID subsystem 6A. However, the present invention is not limited to such a case and a variety of other types of snapshot acquisition systems are widely applicable.

Industrial Applicability

The present invention can, for example, be widely applied to computing systems of a variety of configurations for backing up data, stored in a file storage apparatus or in a storage apparatus that is coupled to the file storage apparatus, to an archive apparatus or to a storage apparatus that is coupled to the archive apparatus.

Reference Signs List 1, 100 Computing system
3 Client/host
4, 101 File storage apparatus
5 Archive apparatus
6A, 6B RAID subsystem
10, 20, 30 CPU
40 Disk device
50, 60 File-sharing program
51, 61 Migration program
52, 62 File system program
52A Reception program
53, 102 Snapshot program
80 Snapshot management table
90 Log file
91 iNode management table
103 Migration history information
DVOL Differential volume
PVOL Primary volume
SVOL Secondary volume
SS, SS1, SS2 Snapshot

The invention claimed is:

1. A computing system, comprising:
a client/host, the client/host comprising a processor;
a first storage apparatus equipped with one or more memory apparatuses and in which first and second logical volumes are configured in a memory area provided by the one or more memory apparatuses;

a file storage apparatus that controls reading/writing of data from/to the first storage apparatus and providing the first logical volume configured in the first storage apparatus to the client/host;

a second storage apparatus equipped with one or more memory apparatuses; and an archive apparatus that controls reading/writing of data from/to the second storage apparatus, wherein the first storage apparatus acquires a full or partial snapshot of the first logical volume at regular or irregular intervals, and when, after acquiring the snapshot, the acquired full or partial snapshot of the first logical volume is updated, saves pre-update data in the first logical volume to the second logical volume, the pre-update data being data that was in the first logical volume before the acquired full or partial snapshot of the first logical volume was updated, wherein the file storage apparatus, in response to a migration request from the client/host, the migration request designating a file from the files stored in the file logical volume, migrates the file designated in the migration request among the files stored in the first logical volume to the second storage apparatus via the archive apparatus, while specifying, from among the files whose data has been saved to the second logical volume, a file for which an amount of capacity used in the second logical volume exceeds a predetermined threshold, causing the first storage apparatus to acquire a snapshot of the specified file, and then causing the first storage apparatus to delete the file from the first logical volume, wherein, when the processor of the client/host causes the client/host to supply a read request to read a file stored in the first logical volume, the file storage apparatus searches for the location where the file is saved, and wherein, when a snapshot of the file has been acquired, the file storage apparatus generates the file on the basis of data stored in the first and second logical volumes, and transfers the generated file to the client/host which is the source of the read request.

2. The computing system according to claim 1, wherein, if the file stored in the first logical volume in the first storage apparatus is migrated to the second storage apparatus via the archive apparatus, and if a snapshot of the file stored in the first logical volume is acquired, the file storage apparatus generates a stub file including address information representing a link destination of the file, and replaces the file in the first logical volume with the generated stub file, wherein when the read request to read the file stored in the first logical volume is supplied from the client/host, the stub file is stored in the storage location of the file designated in the read request, the file storage apparatus searches for the location where the file is saved on the basis of the stub file, and when the read request to read the file stored in the first logical volume is supplied from the client/host, the file is migrated to the second storage apparatus and a snapshot of the file has not been acquired, the file storage apparatus reads the file from the second storage apparatus via the archive apparatus and transfers the read file to the client/host which is the source of the read request, stores the file as a temporary file in the first logical volume, and additionally registers the temporary file as a link destination for the file in the stub file, wherein, for each of the temporary files stored in the first logical volume, the file storage apparatus manages the necessity of snapshot acquisition and, for the temporary files for which snapshot acquisition is not required, deletes the temporary files from the first logical volume and then controls the first storage apparatus to control the first storage apparatus to acquire a full or partial snapshot of the first logical volume, and wherein, for files for which the amount of capacity used in the second logical volume exceeds a threshold, the file storage apparatus prohibits deletion from the first logical volume until a snapshot is next acquired, and deletes the file from the first logical volume after the snapshot is acquired.

3. The computing system according to claim 1, wherein, if the file stored in the first logical volume in the first storage apparatus is migrated to the second storage apparatus via the archive apparatus, and if the file snapshot stored in the first logical volume is acquired, the file storage apparatus generates a stub file including address information indicating the link destination of the file and replaces the file in the first logical volume with the generated stub file, and wherein when the read request to read the file stored in the first logical volume is supplied from the client/host, the stub file is stored in the storage location of the file designated in the read request, the file storage apparatus searches for the location where the file is saved on the basis of the stub file.

4. The computing system according to claim 3, wherein when a read request to read a file stored in the first logical volume is supplied from the client/host, the file is migrated to the second storage apparatus and a snapshot of the file has not been acquired, the file storage apparatus reads the file from the second storage apparatus via the archive apparatus and transfers the read file to the client/host which is the source of the read request, stores the file as a temporary file in the first logical volume, and additionally registers the temporary file as a link destination for the file in the stub file.

5. The computing system according to claim 4, wherein the file storage apparatus manages the necessity of snapshot acquisition for each of the temporary files stored in the first logical volume, and wherein, for the temporary files for which snapshot acquisition is not required, the file storage apparatus deletes the temporary files from the first logical volume and then controls the first storage apparatus to acquire a full or partial snapshot of the first logical volume.

6. The computing system according to claim 1, wherein the file storage apparatus prohibits deletion from the first logical volume until a snapshot is next acquired for files for which the amount of capacity used in the second logical volume exceeds a threshold and, after the snapshot is acquired, deletes the file from the first logical volume.

7. The computing system according to claim 1, wherein the file storage apparatus evaluates the migration accuracy of each of the clients/hosts, and if the migration request is supplied from a client/host for which the migration accuracy is lower than a predetermined standard, controls the first storage apparatus to acquire a snapshot of a file designated in the migration request.

8. A data management method for a computing system, the computing system comprising a first storage apparatus equipped with one or more memory apparatuses and in which first and second logical volumes are configured in a memory area provided by the one or more memory apparatuses, a file storage apparatus for controlling reading/writing of data from/to the first storage apparatus and providing the first logical volume configured in the first storage apparatus to the client/host; a second storage apparatus equipped with one or more memory apparatuses, and an archive apparatus for controlling reading/writing of data from/to the second storage apparatus, the data management method comprising:
- a first step of acquiring, by the first storage apparatus, a full or partial snapshot of the first logical volume at regular or irregular intervals, and when, after acquiring the snapshot, the acquired full or partial snapshot of the first logical volume is updated, saving, by the first storage apparatus, pre-update data in the first logical volume to the second logical volume, the pre-update data being data that was in the first logical volume before the acquired full or partial snapshot of the first logical volume was updated,
- wherein in the first step, in response to a migration request from the client/host, migrating, by the file storage apparatus, the file designated in the migration request from among the files stored in the first logical volume to the second storage apparatus via the archive apparatus, while specifying, among the files having data that has been saved to the second logical volume, a file for which an amount of capacity used in the second logical volume exceeds a predetermined threshold, causing the first storage apparatus to acquire a snapshot of the specified file, and then causing the first storage apparatus to delete the file from the first logical volume;
- a second step of, when a read request to read a file stored in the first logical volume is supplied from the client/host, searching, by the file storage apparatus, for the location where the file is saved; and
- a third step of, when a snapshot of the file has been acquired, generating, by the file storage apparatus, the file based on data stored in the first and second logical volumes, and transferring, by the file storage apparatus, the generated file to the client/host which is the source of the read request.

9. The data management method according to claim 8,
wherein, in the first step, when the file stored in the first logical volume in the first storage apparatus is migrated to the second storage apparatus via the archive apparatus, and when a snapshot of the file stored in the first logical volume is acquired, generating, by the file storage apparatus, a stub file including address information representing a link destination of the file, and replacing, by the file storage apparatus, the file in the first logical volume with the generated stub file,
wherein, in the second step, when the read request to read the file stored in the first logical volume is supplied from the client/host, the stub file is stored in the storage location of the file designated in the read request, the file storage apparatus searches for the location where the file is saved on the basis of the stub file, and
wherein in the third step, when, the read request to read the file stored in the first logical volume is supplied from the client/host, the file is migrated to the second storage apparatus and a snapshot of the file has not been acquired, the file storage apparatus reads the file from the second storage apparatus via the archive apparatus and transfers the read file to the client/host which is the source of the read request, stores the file as a temporary file in the first logical volume, and additionally registers the temporary file as a link destination for the file in the stub file and,
wherein for each of the temporary files stored in the first logical volume, the file storage apparatus manages the necessity of snapshot acquisition and, for the temporary files for which snapshot acquisition is not required in the first step, deletes the temporary files from the first logical volume and then controls the first storage apparatus to control the first storage apparatus to acquire a full or partial snapshot of the first logical volume, and
wherein for files for which the amount of capacity used in the second logical volume exceeds a threshold, the file storage apparatus prohibits deletion from the first logical volume until a snapshot is next acquired, and deletes the file from the first logical volume after the snapshot is acquired.

10. The data management method according to claim 8,
wherein, in the first step, if the file stored in the first logical volume in the first storage apparatus is migrated to the second storage apparatus via the archive apparatus, and if the file snapshot stored in the first logical volume is acquired, the file storage apparatus generates a stub file including address information indicating the link destination of the file and replaces the file in the first logical volume with the generated stub file, and
wherein in the second step, when the read request to read the file stored in the first logical volume is supplied from the client/host, the stub file is stored in the storage location of the file designated in the read request, the file storage apparatus searches for the location where the file is saved on the basis of the stub file.

11. The data management method according to claim 10,
wherein, in the third step, when a read request to read a file stored in the first logical volume is supplied from the client/host, the file is migrated to the second storage apparatus and a snapshot of the file has not been acquired, the file storage apparatus reads the file from the second storage apparatus via the archive apparatus, and transfers the read file to the client/host which is the source of the read request, stores the file as a temporary file in the first logical volume, and additionally registers the temporary file as a link destination for the file in the stub file.

12. The data management method according to claim 11,
wherein the file storage apparatus manages the necessity of snapshot acquisition for each of the temporary files stored in the first logical volume, and
wherein, in the first step, for the temporary files for which snapshot acquisition is not required, the file storage apparatus deletes the temporary files from the first logical volume and then controls the first storage apparatus to acquire a full or partial snapshot of the first logical volume.

13. The data management method according to claim 8, further comprising:
controlling, by the file storage apparatus, the first storage apparatus to prohibit deletion from the first logical volume until a snapshot is next acquired for files for which the amount of capacity used in the second logical volume exceeds a threshold, and after the snapshot is acquired, controlling the file storage apparatus to delete the file from the first logical volume.

14. The data management method according to claim 8, further comprising:
evaluating, by the file storage apparatus, the migration accuracy of each of the clients/hosts, and when the migration request is supplied from a client/host for which the migration accuracy is lower than a predetermined standard, controlling, by the file storage apparatus, the first storage apparatus to acquire a snapshot of a file designated in the migration request.

* * * * *